(12) United States Patent
Conrad

(10) Patent No.: US 10,641,520 B2
(45) Date of Patent: May 5, 2020

(54) FILTER ASSEMBLY FOR HVAC APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 119 days.

(21) Appl. No.: 15/809,536

(22) Filed: Nov. 10, 2017

(65) Prior Publication Data

US 2019/0145655 A1 May 16, 2019

(51) Int. Cl.
| | |
|---|---|
| *B01D 46/10* | (2006.01) |
| *F24F 13/28* | (2006.01) |
| *B01D 46/00* | (2006.01) |
| *B01D 46/52* | (2006.01) |
| *F24F 7/06* | (2006.01) |
| *F24F 12/00* | (2006.01) |

(52) U.S. Cl.
CPC .......... *F24F 13/28* (2013.01); *B01D 46/0005* (2013.01); *B01D 46/0041* (2013.01); *B01D 46/10* (2013.01); *B01D 46/521* (2013.01); *F24F 7/065* (2013.01); *F24F 12/006* (2013.01); *B01D 2271/02* (2013.01); *B01D 2275/205* (2013.01); *B01D 2279/50* (2013.01)

(58) Field of Classification Search
CPC .......... B01D 46/0005; B01D 46/0041; B01D 26/10; B01D 2271/02; B01D 2275/205; B01D 2279/50; B01D 46/10; F24F 13/28; F24F 7/065; F24F 12/006

USPC ................... 55/490, 498, 495, 502, DIG. 31; 277/616, 626, 637, 641, 642, 647
See application file for complete search history.

(56) References Cited

U.S. PATENT DOCUMENTS

| | | | | |
|---|---|---|---|---|
| 6,849,107 B1 * | 2/2005 | Huffman | ............ | B01D 46/0005 250/436 |
| 8,647,405 B2 * | 2/2014 | Gray, Jr. | ............ | B01D 46/0002 55/478 |
| 8,784,528 B2 * | 7/2014 | Gorman | ............ | B01D 46/0002 55/495 |

(Continued)

FOREIGN PATENT DOCUMENTS

CA 2746405 C 10/2015

*Primary Examiner* — Minh Chau T Pham
(74) *Attorney, Agent, or Firm* — Philip C Mendes da Costa; Bereskin & Parr LLP/S.E.N.C.R.L., s.r.l.

(57) ABSTRACT

An HVAC system that utilizes an air-to-air heat exchanger includes an HVAC ductwork section including a fan, and a filter assembly in fluid flow communication with the HVAC ductwork section. The filter assembly has a filter compartment having an opening oriented generally transverse to a direction of air flow through the filter assembly. A compressive member is provided on at least a portion of a perimeter extending around the opening. The compressive member is adjustable between an installation configuration in which the compressive member is spaced from a position that is to be occupied by a filter when the filter is installed in the filter compartment and an installed configuration in which the compressive member engages at least a portion of one of an upstream and a downstream face of the filter when the filter is positioned in the filter compartment.

25 Claims, 48 Drawing Sheets

(56) References Cited

U.S. PATENT DOCUMENTS

| | | | | |
|---|---|---|---|---|
| 9,039,801 B2* | 5/2015 | Gorman | ............ | B01D 46/0005 55/495 |
| 9,114,341 B2* | 8/2015 | Gorman | ............ | B01D 46/0005 |
| 9,610,528 B2* | 4/2017 | Porbeni | ............ | B01D 46/0002 |
| 2006/0037296 A1* | 2/2006 | Duffy | ................ | B01D 46/0001 55/495 |
| 2008/0022705 A1* | 1/2008 | Clearman | ............ | F24F 3/1405 62/173 |
| 2010/0101197 A1* | 4/2010 | Livingstone | ....... | B01D 46/0006 55/356 |
| 2013/0291502 A1* | 11/2013 | Gorman | ............ | B01D 46/0005 55/490 |
| 2015/0335164 A1* | 11/2015 | Liu | ..................... | A47C 27/081 428/12 |
| 2018/0345194 A1* | 12/2018 | Gregerson | ......... | B01D 46/0005 |

\* cited by examiner

FIG. 2.3

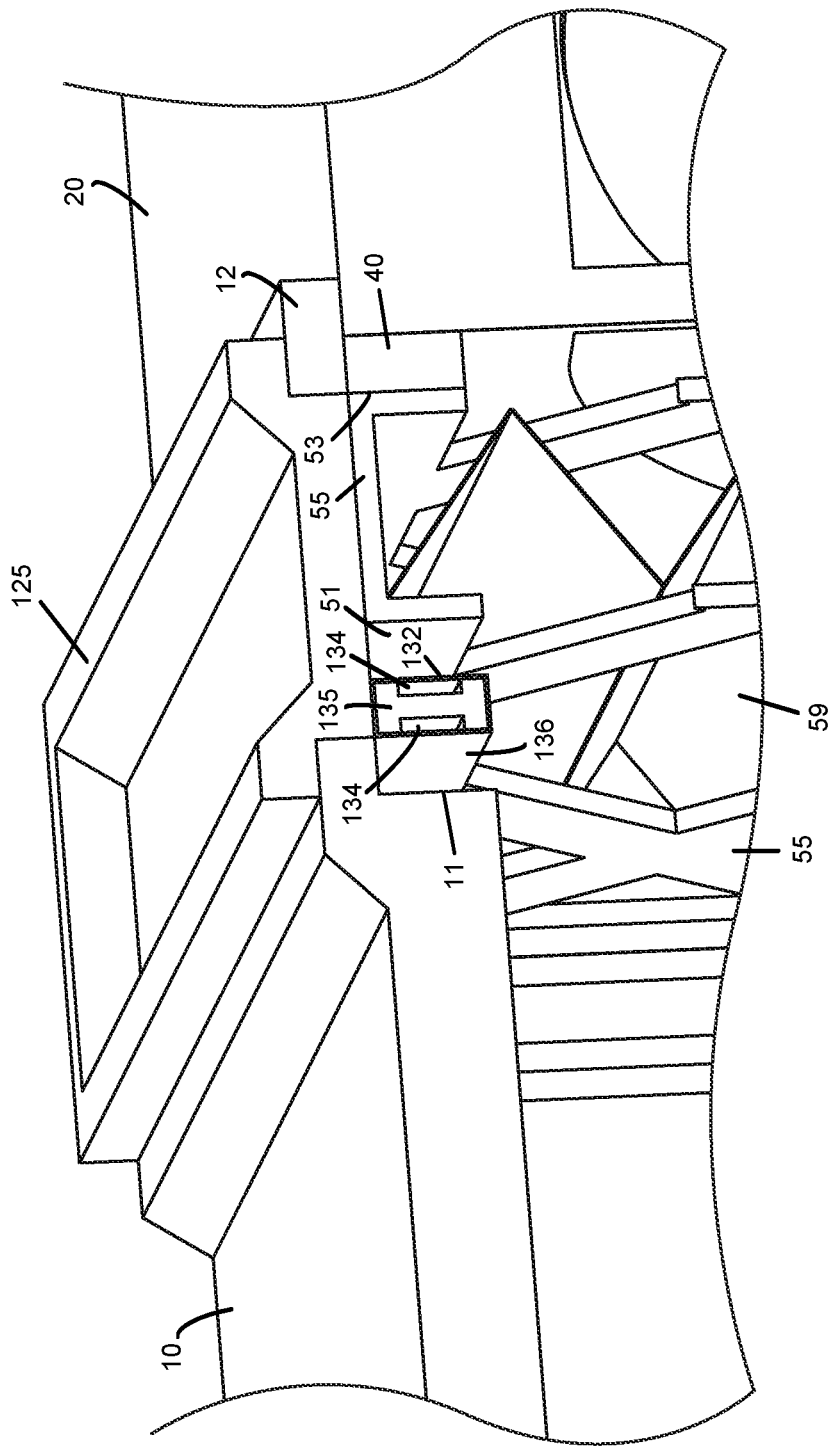

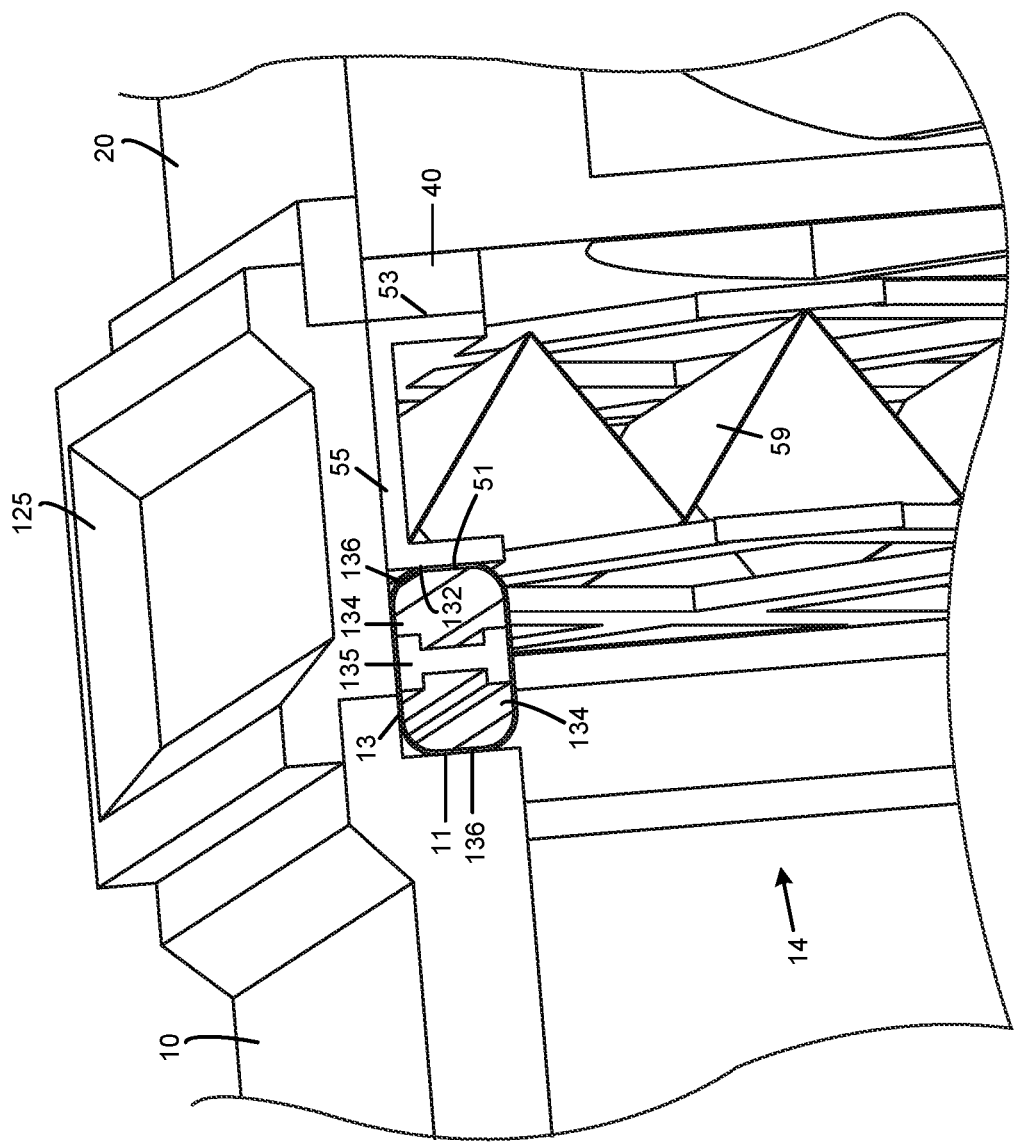

FILTER ASSEMBLY FOR HVAC APPARATUS

FIELD

This disclosure relates generally to apparatus and methods for installing a filter in an HVAC system. More specifically, this disclosure relates to apparatus and methods for installing an air filter so as to reduce or inhibit air bypassing the filer, such as the use of a compressive member that is adjustable to engage part or all of, e.g., the upstream and/or downstream side of, an air filter in an installed configuration.

INTRODUCTION

The following is not an admission that anything discussed below is part of the prior art or part of the common general knowledge of a person skilled in the art.

Ventilation or airflow systems are used to convey air into, out of, and/or within residential, commercial, and/or industrial buildings. For example, most residential buildings have a ventilation system for drawing in, circulating, and exhausting air at one or more locations within the building. In multi-unit residential dwellings, each unit may have its own independent dedicated fresh air intake and air exhaust system.

A ventilation system may include one or more devices or apparatus for treating or conditioning the air to provide an environment with desired air characteristics, such as temperature, humidity, cleanliness, etc. For example, a heat recovery ventilation system for tempering air in colder climates may include a cross-flow or counter-flow heat exchanger between a fresh air intake and an exhaust air outlet.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

A ventilation system for a residential, commercial, and/or industrial building may include one or more filtration members positioned in the airflow for 'cleaning' air flowing through the system. Filtering the airflow within an HVAC system may have one or more advantages. For example, an airflow filter may trap dust or other allergens, thereby preventing them from entering a building (such as a residential dwelling), and/or from circulating or recirculating within a building. This may be considered desirable by occupants of the building. Such filtering systems may be used regardless of whether outside air is drawn into a building such as by an air-to-air heat exchanger.

Examples of typical HVAC filtration members include electrostatic filters and physical filters. Typical physical HVAC filters have a filter media (e.g., a HEPA filter, paper filter, felt filter, and the like) provided in a frame or housing (e.g. a paperboard or plastic housing), and are designed to be positioned in the airflow path such that they may be removed for cleaning and/or replaced on a periodic basis.

In accordance with one aspect of this disclosure, which may be used alone or in combination with any other aspect, an HVAC system, which may include an air-to-air heat exchanger, has an HVAC ductwork section including a fan and a filter assembly in fluid flow communication with the HVAC ductwork section. The filter assembly includes a filter compartment having an opening, which may be oriented generally transverse to a direction of air flow through the filter assembly. A compressive member, such as an inflatable member and/or an expandable member and/or a moveable member (e.g., translatable along an axis of airflow through the filter compartment), is provided to engage at least a portion of a perimeter of the filter. The compressive member is adjustable between an installation configuration in which the compressive member is spaced from a position that is to be occupied by a filter when the filter is installed in the filter compartment, and an installed configuration in which the compressive member engages at least a portion of the filter (e.g., an upstream and or downstream face of the filter) when the filter is positioned in the filter compartment. The compressive member may form a seal at the location at which it engages the filter when in the installed configuration and/or may cause the filter to engage a sealing member (e.g., a gasket).

An advantage of this design is that, by engaging a filter positioned in the filter compartment, the compressive member may direct and/or maintain the filter in a position in which the filter is sealed to or seated securely against a portion of the filter compartment (e.g., a wall defining an opening in which the filter is positionable, a gasket or other sealing member which may be provided on such a wall) on preferably the downstream side and optionally only on the upstream side or on both the upstream and downstream sides of the filter compartment. In some embodiments, the compressive member itself may form all or part of a seal on at least one of the upstream side and the downstream side (e.g. without requiring a separate gasket or other sealing member). Once the compressive member has engaged the filter and a seal has been established, air may be inhibited or substantially prevented or prevented from travelling between the filter and the filter compartment, and thereby inhibited from bypassing the filter media. A typical HVAC physical filter media may be effective at removing very fine particles from an airflow passing through the filter media (e.g. a HEPA filter and/or a filter sold under the Filtrete™ brand). In accordance with this aspect, the filter may treat all of the air passing through the filtration system as the air is inhibited or substantially prevented or prevented from leaking past the filter. It will be appreciated that the filter may comprise an electrostatic filter and not a physical filter media.

In accordance with this broad aspect, there is provided an HVAC system utilizing an air-to-air heat exchanger comprising:
a) an HVAC ductwork section including a fan;
b) a filter assembly in fluid flow communication with the HVAC ductwork section, the filter assembly comprising a filter compartment, the filter compartment comprising an opening oriented generally transverse to a direction of air flow through the filter assembly, a perimeter extending around the opening and a compressive member provided on at least a portion of the perimeter, wherein the compressive member is adjustable between an installation configuration in which the compressive member is spaced from a position that is to be occupied by a filter when the filter is installed in the filter compartment and an installed configuration in which the compressive member engages at least a portion of one of an upstream and a downstream face of the filter when the filter is positioned in the filter compartment.

In some embodiments, in the installed configuration, the compressive member may engage substantially all of a periphery of one of the upstream and the downstream face of the filter when the filter is positioned in the filter compartment.

In some embodiments, in the installed configuration, the compressive member may engage the downstream face of the filter. An advantage of this design is that all or substantially all of the air entering the portion of the ducting that extends to the treated air outlets of the ducting system may be filtered.

In some embodiments, in the installed configuration, the compressive member may engage substantially all of a periphery of the downstream face of the filter.

In some embodiments, in the installed configuration, the compressive member may engage substantially both the upstream and the downstream face of the filter.

In some embodiments, in the installed configuration, the compressive member may engage the upstream face of the filter.

In some embodiments, in the installed configuration, the compressive member may engage substantially all of a periphery the upstream face of the filter.

In some embodiments, the compressive member may be expandable after the filter has been installed in the filter compartment.

In some embodiments, the compressive member may be inflatable.

In some embodiments, the portion of the perimeter having the compressive member may be moveable towards and away from the position that is to be occupied by a filter when the filter is installed in the filter compartment whereby, in the installation configuration the portion is spaced from the position that is to be occupied by a filter when the filter is installed in the filter compartment.

Also in accordance with this broad aspect, there is provided a filter assembly for a HVAC apparatus comprising a filter compartment having:
a) an opening oriented generally transverse to a direction of air flow through the filter assembly;
b) a perimeter extending around the opening; and,
c) a compressive member provided on at least a portion of the perimeter,
wherein the compressive member is adjustable between an installation configuration in which the compressive member is spaced from a position that is to be occupied by a filter when the filter is installed in the filter compartment and an installed configuration in which the compressive member engages at least a portion of one of an upstream and a downstream face of the filter when the filter is positioned in the filter compartment.

In some embodiments, in the installed configuration, the compressive member may engage substantially all of a periphery of one of the upstream and the downstream face of the filter when the filter is positioned in the filter compartment.

In some embodiments, in the installed configuration, the compressive member may engage the downstream face of the filter.

In some embodiments, in the installed configuration, the compressive member may engage substantially all of a periphery of the downstream face of the filter.

In some embodiments, in the installed configuration, the compressive member may engage substantially both the upstream and the downstream face of the filter.

In some embodiments, in the installed configuration, the compressive member may engage the upstream face of the filter.

In some embodiments, in the installed configuration, the compressive member may engage substantially all of a periphery of the upstream face of the filter.

In some embodiments, the compressive member may be expandable after the filter has been positioned in the filter compartment.

In some embodiments, the compressive member may be inflatable.

In some embodiments, the portion of the perimeter having the compressive member may be moveable towards and away from the position that is to be occupied by a filter when the filter is installed in the filter compartment whereby, in the installation configuration the portion is spaced from the position that is to be occupied by a filter when the filter is installed in the filter compartment.

Some HVAC systems may include a heat recovery ventilation system such as a cross-flow or counter-flow heat exchanger. Typically, an accumulation of particulate matter on surfaces within the 'core' of the heat exchanger may reduce the efficiency and/or effectiveness of the heat exchanger. In accordance with another aspect of this disclosure, which may be used alone or in combination with any other aspect, a sealed air filter assembly may be positioned upstream of one or more air inlet ports of an air-to-air heat exchanger. An advantage of this design is that the sealed air filter assembly may inhibit, substantially prevent, or prevent dust or other particulate matter from accumulating on surfaces within the heat exchanger.

In accordance with this broad aspect, there is provided an HVAC system comprising:
a) an air-to-air heat exchanger, the air-to-air heat exchanger having an outside air inlet port and an inside air inlet port;
b) an inside air HVAC ductwork section positioned upstream from the inside air inlet port, the inside air HVAC ductwork section including an inside air exhaust fan;
c) an outside air HVAC ductwork section positioned upstream from the outside air inlet port, the outside air HVAC ductwork section including an outside air delivery fan; and,
d) at least one of
  i) an inside air filter sealed assembly positioned upstream from the inside air inlet port; and,
  ii) an outside air filter sealed assembly positioned upstream from the inside air outlet port.

In some embodiments, the HVAC system may comprise both the inside air filter sealed assembly and the outside air filter sealed assembly.

In some embodiments, the HVAC system may comprise the inside air filter sealed assembly and the inside air sealed filter assembly may be positioned upstream of the inside air exhaust fan.

In some embodiments, the HVAC system may comprise the outside air filter sealed assembly and the outside air sealed filter assembly may be positioned upstream of the outside air delivery fan.

In some embodiments, the HVAC system may comprise the outside air filter sealed assembly and the outside air sealed filter assembly may be positioned upstream of the outside air delivery fan.

In some embodiments, the at least one of the inside air filter sealed assembly and the outside air filter sealed assembly may comprises a compressive member that is adjustable between an installation configuration in which the compressive member is spaced from a position that is to be occupied by a filter when the filter is installed and an installed configuration in which the compressive member engages at least a portion of one of an upstream and a downstream face of the filter when the filter is installed.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 47 is a perspective sectional view of a portion of the filter assembly, HVAC ductwork section, and fan of FIG. 45, with a filter positioned in the filter compartment, and with the compressive member in an installation configuration; and FIG. 48 is a perspective sectional view of a portion of the filter assembly, HVAC ductwork section, and fan of FIG. 45, with a filter positioned in the filter compartment, and with the compressive member in an installed configuration.

Figure 1:
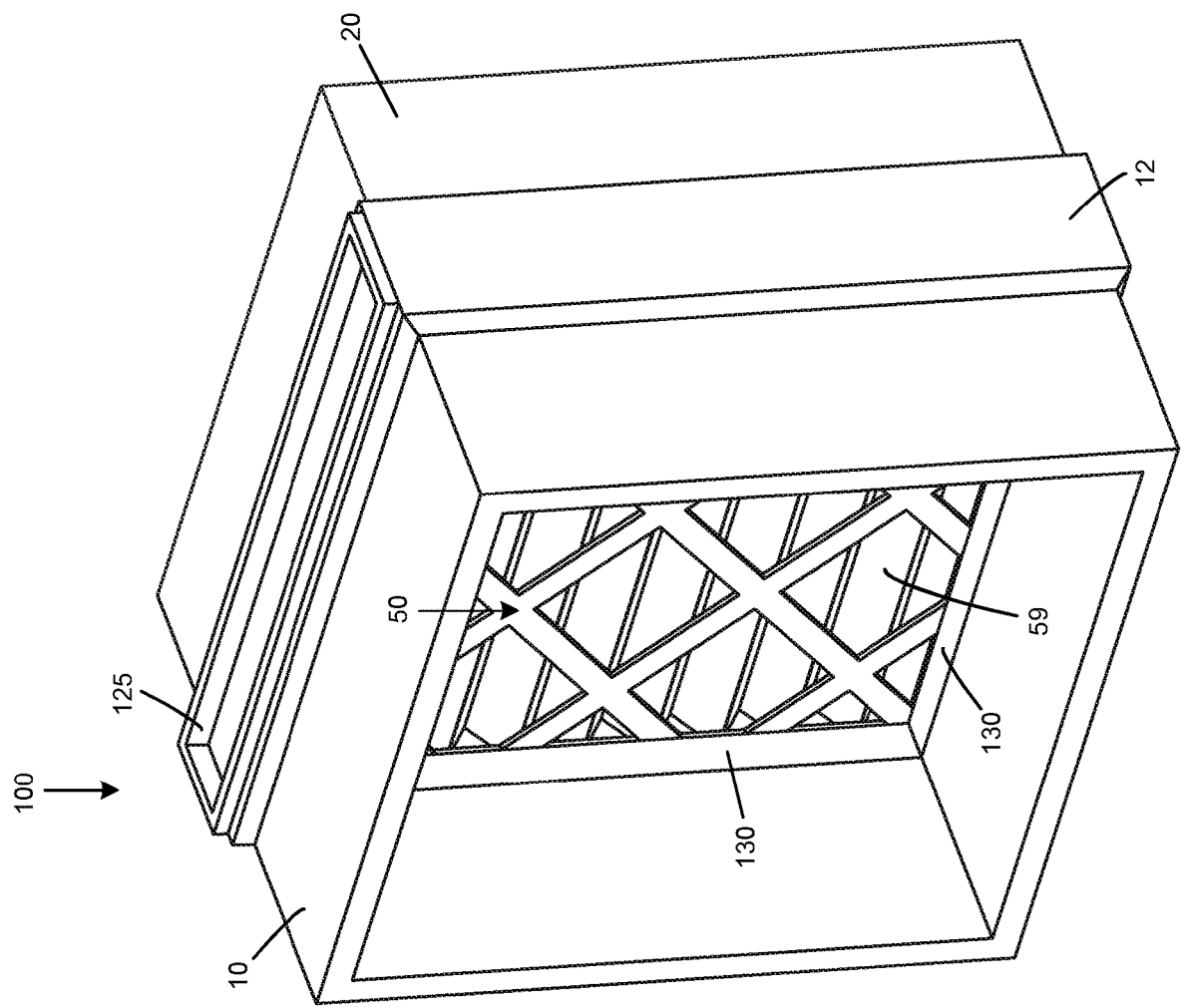
FIG. 1 is a perspective view of a filter assembly, an HVAC ductwork section, and a fan in accordance with one embodiment, with a filter positioned in a filter compartment of the filter assembly.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of an HVAC Filter Assembly

Referring to FIGS. 1 to 8, an exemplary embodiment of a filter assembly is shown generally as 100, in conjunction with an HVAC ductwork section and a fan. The following is a general discussion of this embodiment which provides a basis for understanding several of the features which are discussed herein. As discussed subsequently, each of the features may be used individually or in any particular combination or sub-combination in this or in other embodiments disclosed herein.

Figure 2:
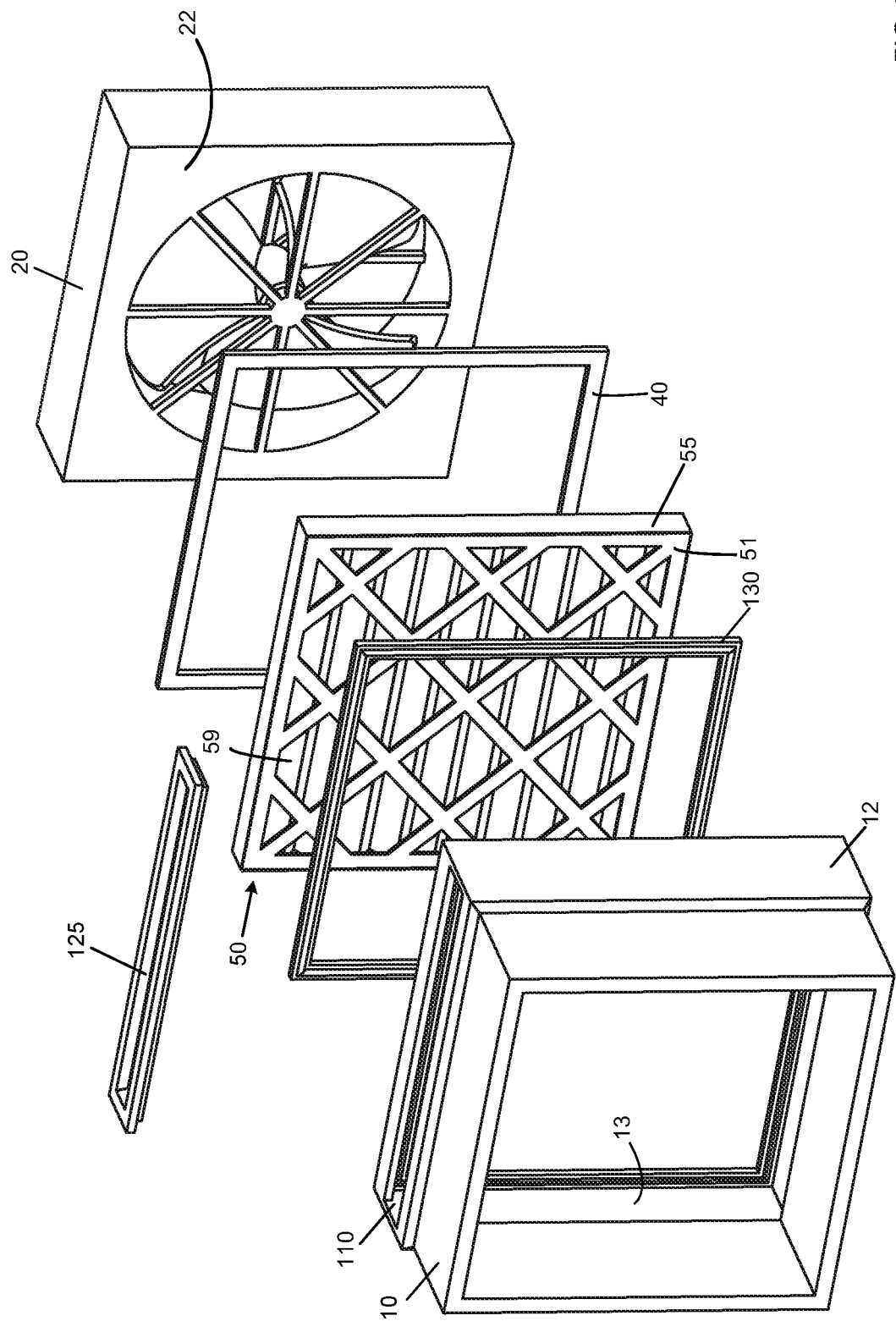
FIG. 2 is an exploded view of the filter assembly, HVAC ductwork section, fan, and filter of FIG. 1.

With reference to FIGS. 1 and 2, an HVAC ductwork section may include an airflow conduit 10 and an airflow fan 20. A filter assembly, referred to generally as 100, is positioned between conduit 10 and fan 20. Filter assembly 100 includes a filter compartment 110 sized to receive a filter 50, such that the filter is positioned in the airflow path when the filter is positioned in the filter compartment. It will be appreciated that filter compartment 110 may be positioned at any desired location in the HVAC system.

In the illustrated example, filter compartment 110 is defined between interior surfaces of conduit 10 and a face of airflow fan 20. More specifically, in the illustrated example end 12 of conduit 10 is dimensioned to receive end 22 of fan 20, thereby providing, e.g., an insertion fit between fan 20 and conduit 10. Filter compartment 110 is bounded by interior surface 13 of the conduit end 12, and by face 21 of fan 20. Alternatively, a filter compartment 110 may be provided as a separate structure coupled to one or both of conduit 10 and fan 20.

Preferably, an opening is provided to the filter compartment 110 to facilitate the insertion and removal of a filter 50, e.g. without requiring the decoupling of fan 20 and conduit 10. In the illustrated example, a slot 120 is provided in a side of filter compartment 110, through which a filter 50 can be inserted or removed, e.g. as shown in FIGS. 3 and 4 and FIGS. 11 to 15. In the illustrated example, an optional lid or cover 125 is provided for closing slot 120.

Also, in this exemplary arrangement an interior ridge 11 extends around the perimeter of an opening 14 between conduit 10 and filter compartment 110. Interior ridge 11 may provide support for a compressive member 130, as discussed further below. It will be appreciated that interior ridge 11 may have a height that is similar to or the same as the thickness of a compressive member 130 and/or the thickness of frame 55 of the filter inserted in compartment 110. Accordingly, the cross sectional area of air flow through the conduit and the filter compartment may be generally the same.

In the illustrated example, filter 50 includes a housing or frame 55 and a pleated filter media 59 supported by the frame 55. Other types of physical filter media and/or an electrostatic filter may be used. Filter media 59 may be any suitable physical porous filter media, including, for example, a HEPA filter, Filtrete™ filter, paper filter, felt filter, and the like. Frame 55 may be any suitable material that provides support for the filter media or member, such as metal, plastic, wood, air impenetrable fabric, cardboard, and the like.

In the illustrated example, frame 55 extends around the entire periphery of filter 50. Also, frame 55 has a first frame face 51 or upstream frame face that extends around the periphery of a first face 52 of filter 50, and a second frame face 53 or downstream frame face that extends around the periphery of a second face 54 of filter 50.

In the illustrated example, filter assembly 100 and filter compartment 110 are generally rectangular, and would be suitable for use with a rectangular airflow conduit, such as conduit 10 in the illustrated examples. Alternatively, filter assembly 100 and/or filter compartment 110 may have a generally circular shape, suitable for use with a generally circular conduit, or any other desired shape.

Also, as exemplified in the illustrated example, filter 50 may have a complimentary shape to the shape of the filter compartment and may therefore be generally rectangular. Alternatively, filter 50 may have a generally circular shape, suitable for use with a generally circular conduit, or any other desired shape.

Filter assembly 100 also includes a compressive member 130 that is adjustable to engage part or all or substantially all of a filter. For example, the compressive member 130 may engage a perimeter of the filter (i.e., a face extending between the upstream and downstream faces of the filter) or a portion of one or both of the upstream face and/or downstream face of a filter when the filter is positioned in the filter compartment 110. By engaging a filter positioned in the filter compartment, compressive member 130 may maintain the filter in a position in which the filter frame is sealed and/or seated securely against frame members defining a flow opening in compartment 110, whereby air may be inhibited from travelling between the filter and frame members of the filter compartment, and thereby inhibited from bypassing the filter media. The compressive member preferably engages a frame 55 of the filter media (e.g., frame face 51 and/or 53), but in some embodiments, it may engage the filter media directly.

The compressive member 130 may be any member that is adjustable by movement of the member and/or reconfiguration of the member so as to engage a filter to reduce, inhibit, or prevent air from exiting the HVAC system or bypassing the filter.

Figure 3:
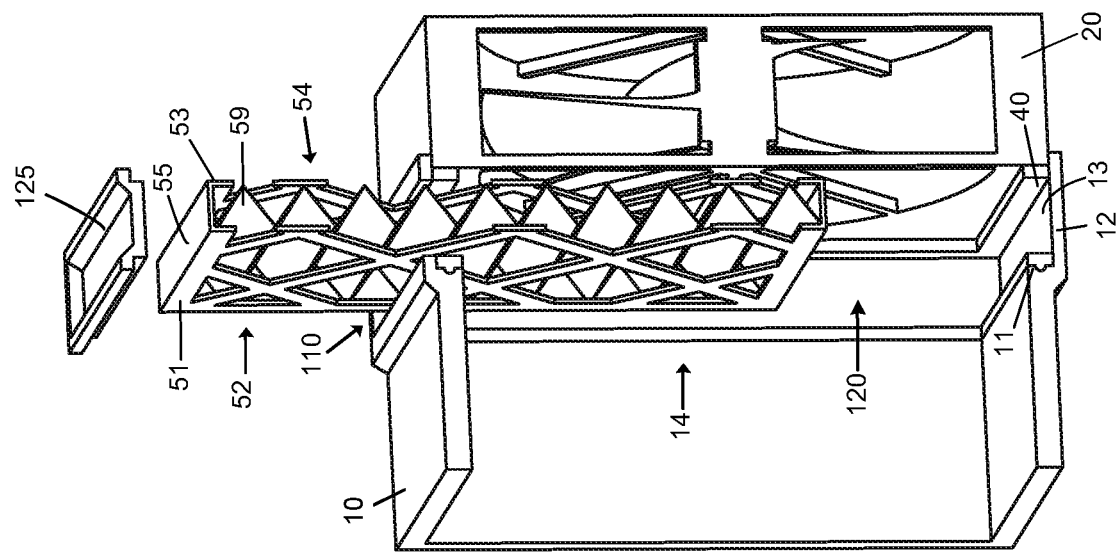
FIG. 3 is a perspective sectional view of the filter assembly, HVAC ductwork section, and fan of FIG. 1, with a filter partially positioned in the filter compartment, and with a compressive member in an installation configuration.
Figure 4:
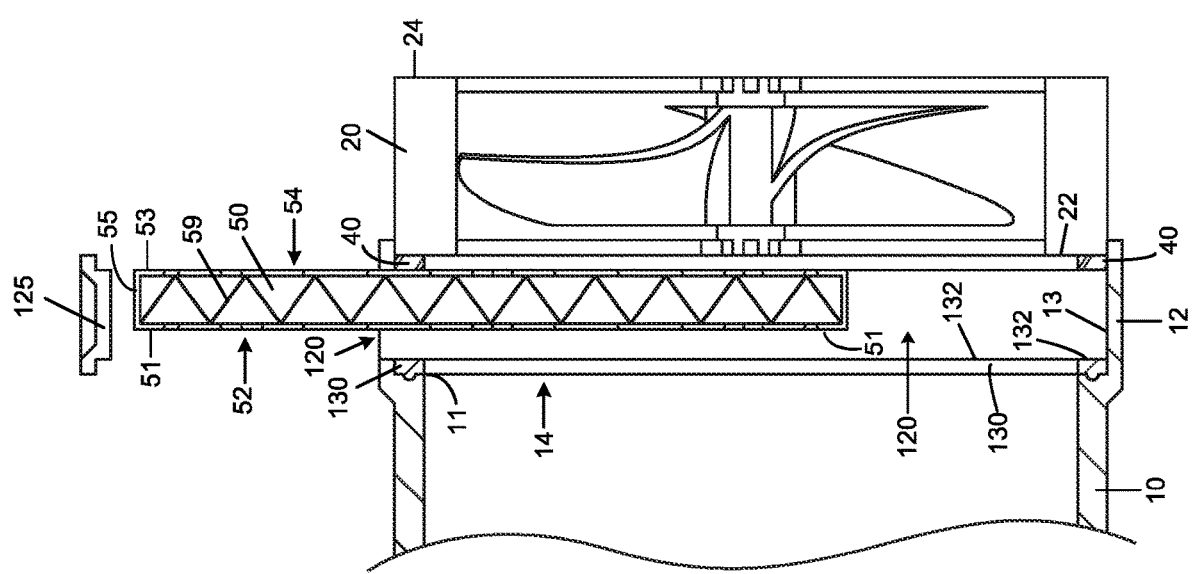
FIG. 4 is a cross-section view of the filter assembly, HVAC ductwork section, and fan of FIG. 1, with a filter partially positioned in the filter compartment, and with a compressive member in an installation configuration.
Figure 5:
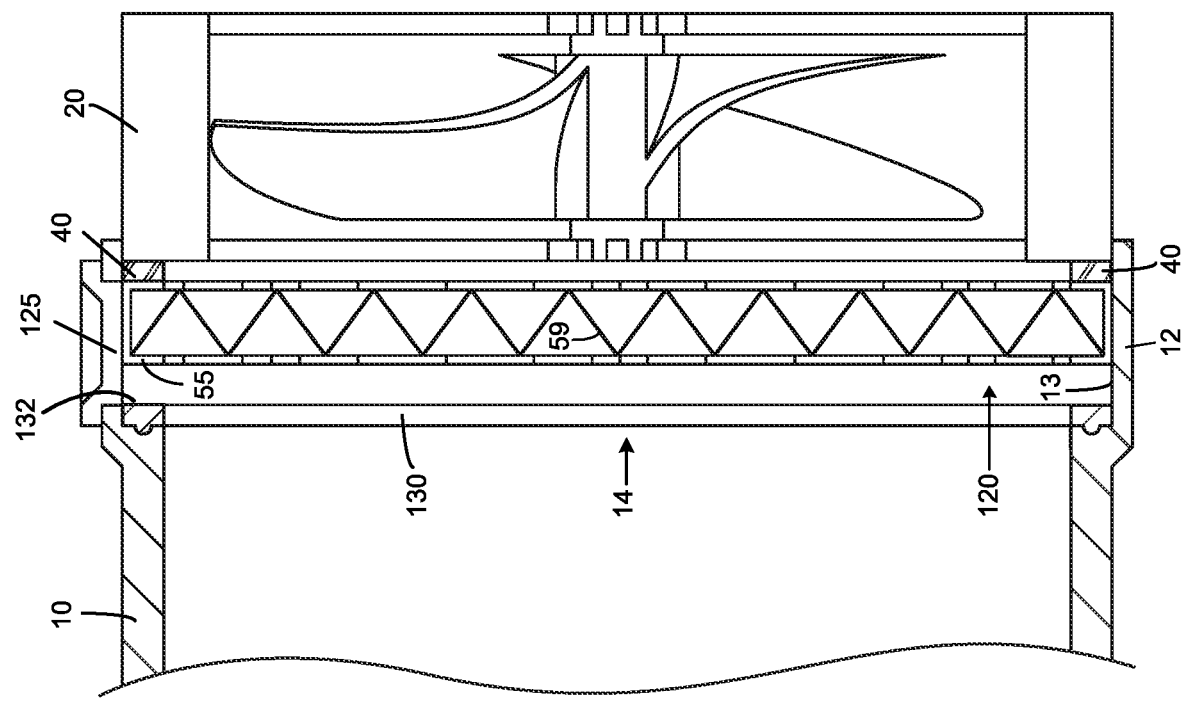
FIG. 5 is a cross-section view of the filter assembly, HVAC ductwork section, and fan of FIG. 1, with a filter positioned in the filter compartment, and with a compressive member in an installation configuration.
Figure 6:
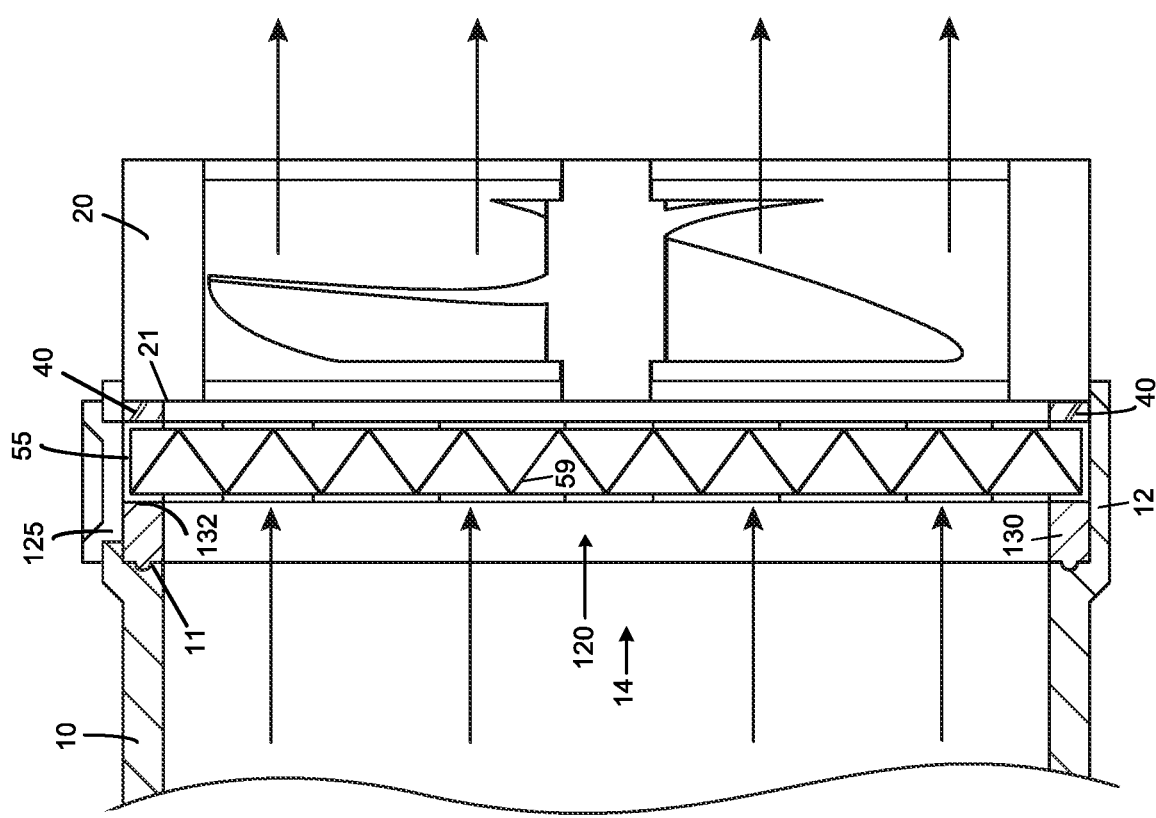
FIG. 6 is a cross-section view of the filter assembly, HVAC ductwork section, and fan of FIG. 1, with a filter positioned in the filter compartment, and with a compressive member in an installed configuration.

For example, as shown in FIG. 5 a filter 50 may be positioned in filter compartment 110 (e.g. via slot 120 as shown in FIGS. 3 and 4) with compressive member 130 disengaged from filter 50. With filter 50 in position, compressive member 130 may be adjusted to engage the upstream face of filter 50, e.g. as shown in FIG. 6, maintaining the upstream face of filter 50 against gasket 40.

Expandable, Inflatable, or Deformable Compressive Members

The compressive member 130 may be a member that is expanded, inflated, deformed or the like so as to seal against the filter. For example, the compressive member 130 may be a hollow member that is inflated once the filter is positioned in compartment 110, it may be provided on a frame member (e.g., a sealing member such as a gasket or the like) that is moveable so as to engage and compress against the frame, or it may be a solid member that is compressed in a first direction transverse to a direction of flow through compartment 110 so as to cause the solid member to expand in the direction of flow through compartment 110.

In the example illustrated in FIGS. 1 to 8, compressive member 130 is an elastomeric member that can be fluidically or mechanically expanded, inflated, or otherwise deformed so as to apply a force to filter 50 in a direction from the opening 14 (e.g. from interior ridge 11) towards fan 20 (e.g., parallel to the flow direction through the compartment 110).

For example, compressive member 130 may be an inflatable member. By introducing a fluid (i.e. a gas or a liquid) into one or more cavities interior to the compressive member 130, and/or positioned between the compressive member and the compartment 110 in which it is secured (e.g. interior ridge 11 of filter compartment 110), the cavities may be inflated until the compressive member comes into contact with filter 50. The elastomeric nature of compressive member 130 may result in the formation of a seal between compressive member 130 and filter 50. In other words, in the illustrated example a seal between compressive member 130 and filter 50 may also inhibit or prevent air from bypassing filter 50 on its way to fan 20.

In the illustrated example, an optional sealing member in the form of a gasket 40 may be provided between filter 50 and fan 20. In this arrangement, when the filter 50 is engaged by compressive member 130 and filter 50 is pressed against gasket 40, gasket 40 engages face 53 and inhibits air from bypassing filter 50 by travelling between filter frame 55 and interior surface 13 of filter compartment 110. Put another way, in the illustrated example it is primarily the seals between filter 50, gasket 40, and fan 20 that prevents air from bypassing filter 50 on its way to or from fan 20.

Alternatively, or additionally, an optional sealing member in the form of a gasket may be provided on the part of the compressive member 130 that engages the filter.

It will be appreciated that in an installed configuration (e.g., as shown in FIG. 6), compressive member 130, with an optional gasket 40, and/or optional cover 125 may also inhibit air from escaping from filter assembly, thereby maintaining an integrity of the airflow path between conduit 10 and fan 20.

Figure 7:
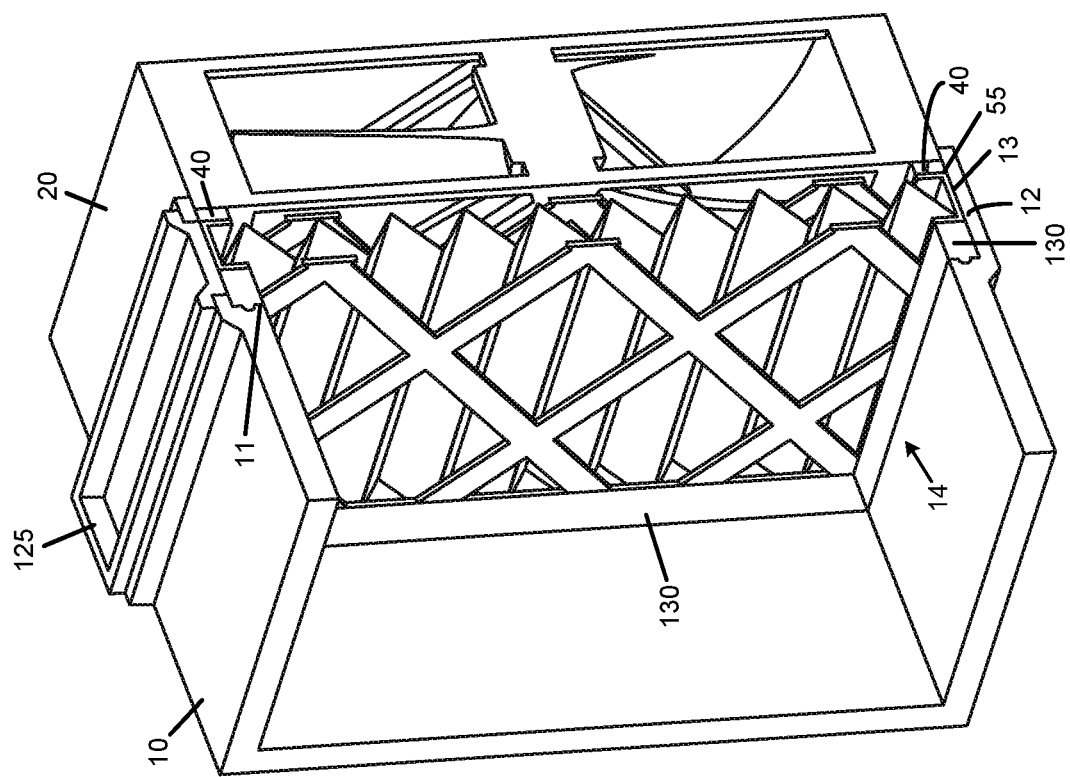
FIG. 7 is a perspective sectional view of the filter assembly, HVAC ductwork section, and fan of FIG. 1, with a filter positioned in the filter compartment, and with a compressive member in an installed configuration.
Figure 8:
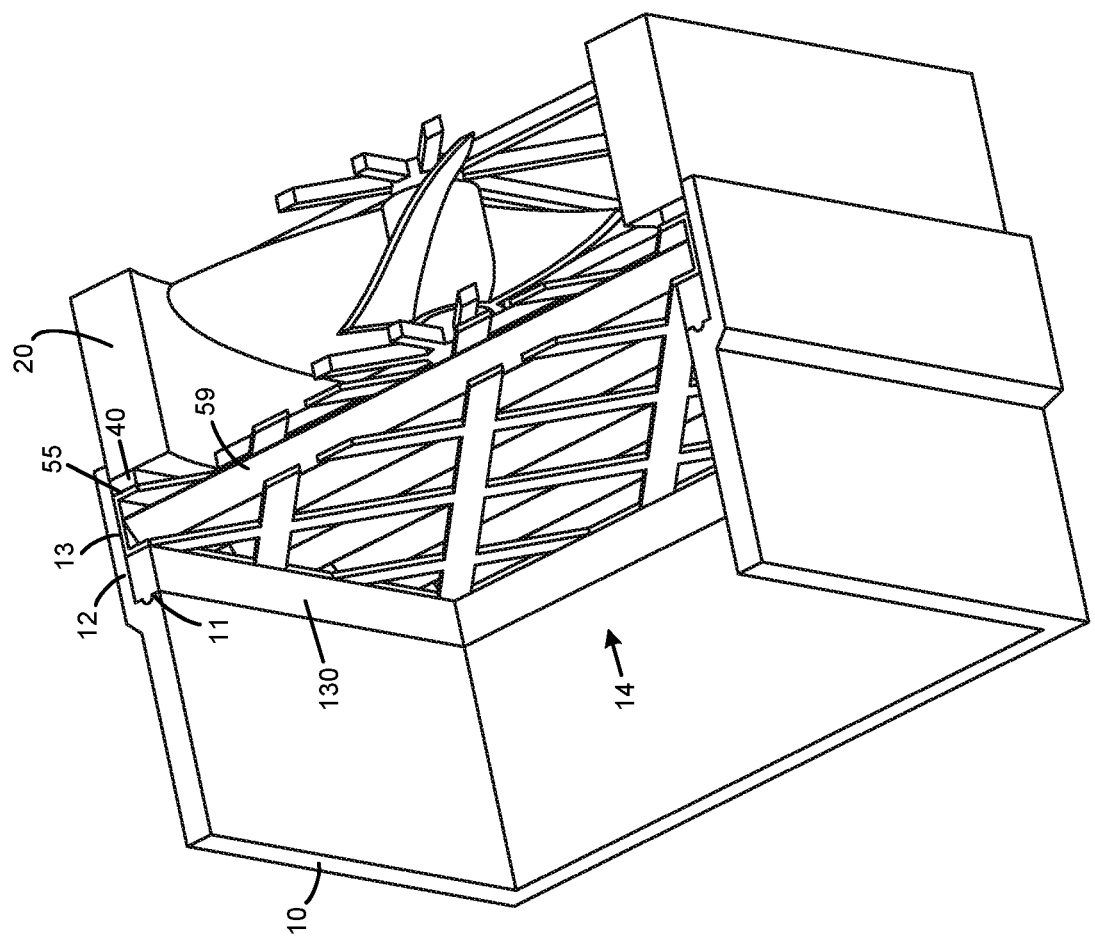
FIG. 8 is a perspective sectional view of the filter assembly, HVAC ductwork section, and fan of FIG. 1, taken along line 8-8, with a filter positioned in the filter compartment, and with a compressive member in an installed configuration.

In the example illustrated in FIGS. 1 to 8, in the installed configuration compressive member 130 may engage all of or substantially the entire periphery of filter 50. For example, as illustrated in FIGS. 7 and 8, compressive member 130 is in contact with first frame face 51 of frame 55 around the entire periphery of filter 50. Alternatively, in the installed configuration compressive member 130 may engage less than the entire periphery of filter 50. For example, filter engagement surface 132 of compressive member 130 may have one or more projections, recesses, or other discontinuities (not shown) so that compressive member 130 may engage filter 50 (e.g. filter frame 55) at a plurality of discrete points, in contrast to the substantially continuous contact in the illustrated example.

Also, as exemplified in FIGS. 1 to 8, compressive member 130 may be positioned between opening 14 of filter compartment 110 (i.e. between interior ridge 11) and filter 50, and in the installed configuration (e.g. as shown in FIGS. 1 and 6 to 8), applies a force to filter 50 in a direction from the opening 14 towards fan 20. Alternatively, compressive member 130 may be positioned between filter 50 and fan 20, and in the installed configuration apply a force to filter 50 in a direction from the fan 20 towards opening 14. In such configurations, optional seal or gasket 40 may be positioned between opening 14 of filter compartment 110 and filter 50 (i.e. between interior ridge 11 and filter 50).

Moveable Compressive Members

Alternatively, or in addition, the compressive member may be a moveable part of the filter compartment or assembly that engages the filter frame to abut the frame and, optionally, to move the frame against a portion of the filter compartment, such as a wall of the filter compartment. A sealing member, such as a gasket or the like, may be provided on the portion of the compartment against which the filter abuts and/or on the moveable part. For example, the compressive member may have a moveable face that moves in a direction parallel to a direction of flow through compartment 110 whereby the moveable face abuts the filter and moves the filter in a direction parallel to a direction of flow through compartment 110 into contact with a gasket. Alternately, or in addition to being slideable, the compressive member may be rotatable or insertable as discussed subsequently. The moveable face may be biased to a position in which it engages the filter.

An example of such a design is shown in FIGS. 23 to 27 wherein a slidable compressive member engages a filter 50 positioned in a filter compartment 110. Elements having similar structure and/or performing similar function as those in the example filter assembly illustrated in FIGS. 1 to 8 are numbered similarly, and will not be discussed further.

In accordance with this embodiment, compressive member 130 may be provided proximate the opening 14 between conduit 10 and filter compartment 110, and may be slid or otherwise translated to engage a filter 50 positioned in the filter compartment 110. As exemplified, the compressive member 130 may be a rigid frame member with a sealing member such as a skirt 131 or other extendable material that extends between the rigid frame member and the ducting. The rigid frame member may be of about the same cross section as the ducting upstream of the compressive member and may have a face that abuts a frame of the filter. An optional sealing gasket or the like may be provided on the face of the rigid frame member that engages the filter.

Figure 23:
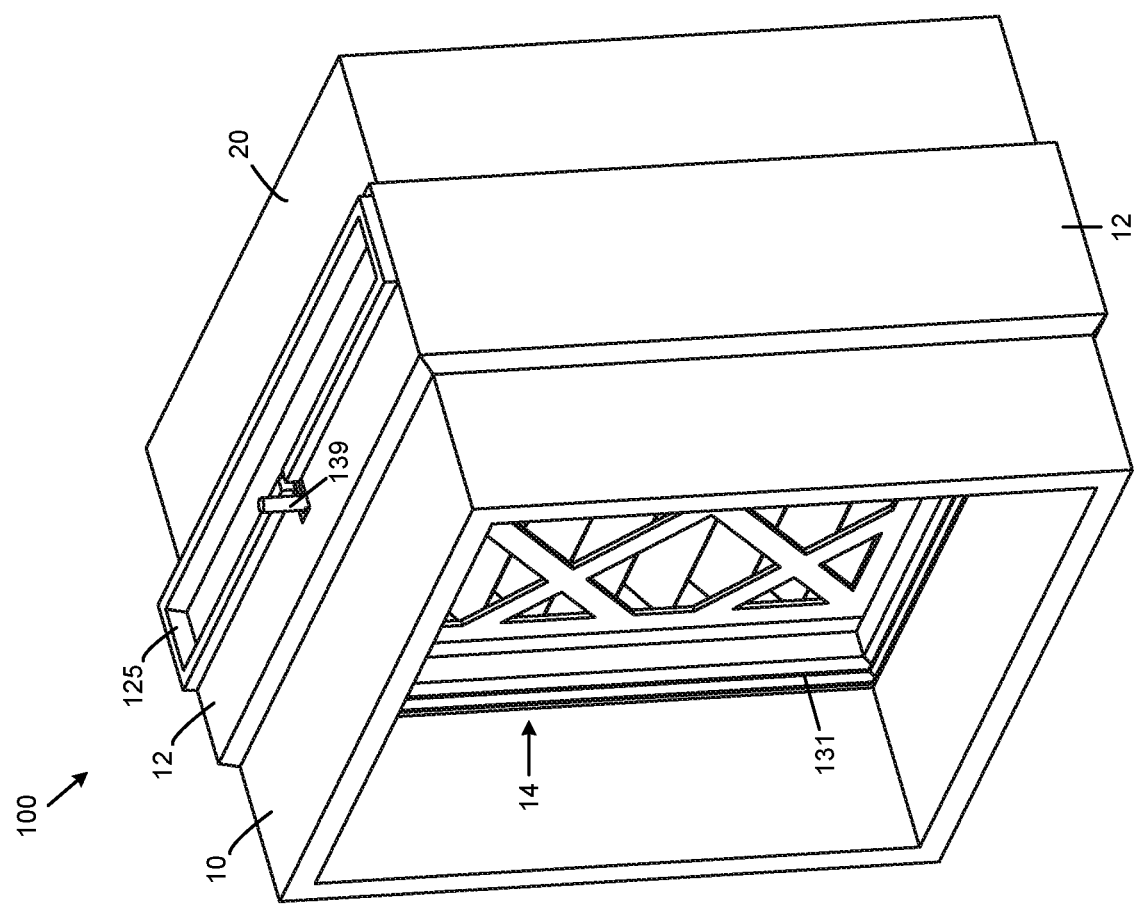
FIG. 23 is a perspective view of a filter assembly, HVAC ductwork section, and fan in accordance with another embodiment, with a filter positioned in the filter compartment, and with a compressive member in an installation configuration.
Figure 24:
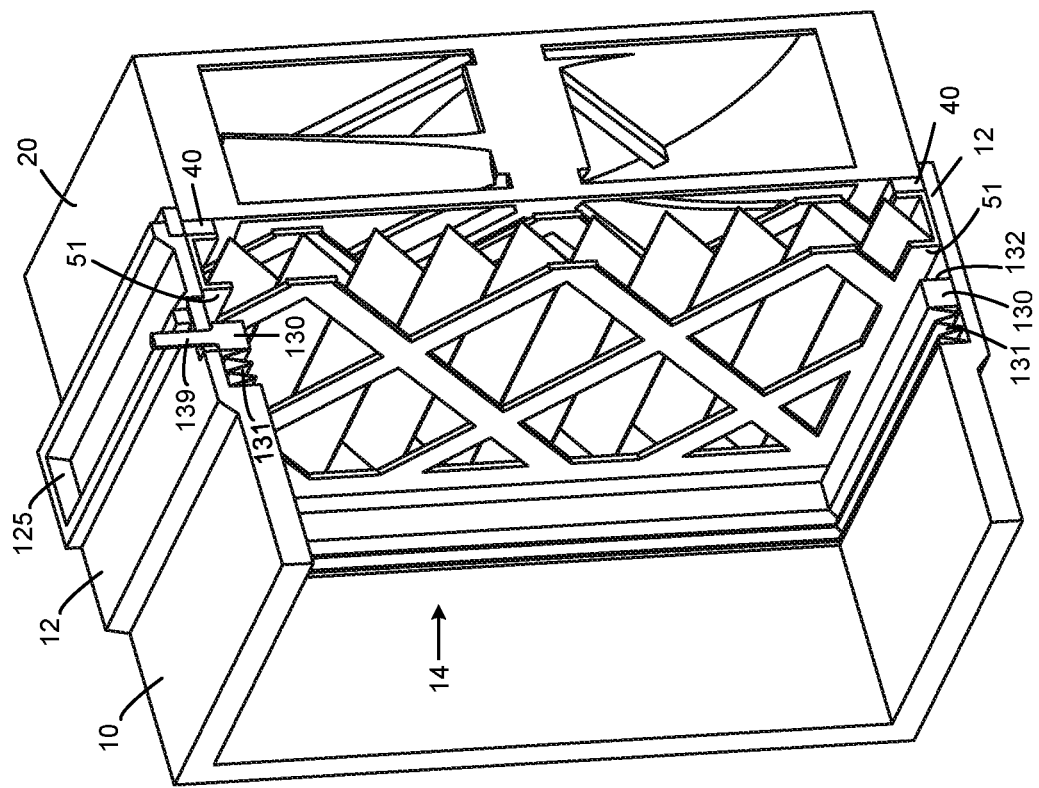
FIG. 24 is a perspective sectional view of the filter assembly, HVAC ductwork section, and fan of FIG. 23, with a filter positioned in the filter compartment, and with the compressive member in an installation configuration.
Figure 25:
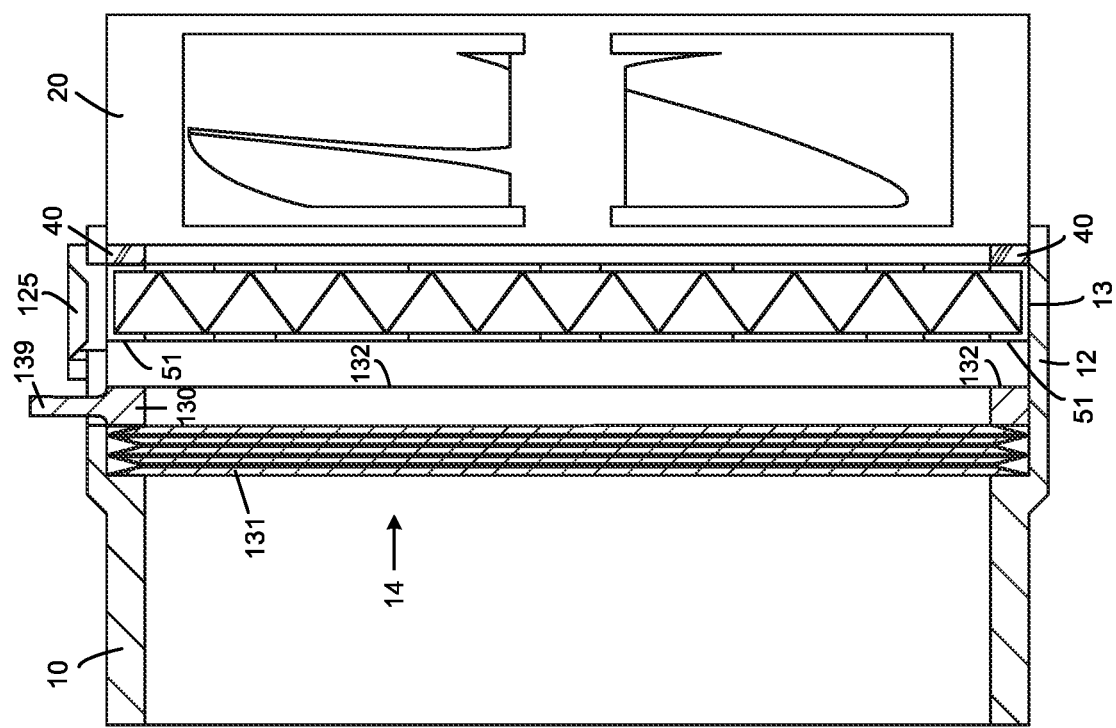
FIG. 25 is a cross-sectional view of the filter assembly, HVAC ductwork section, and fan of FIG. 23, with a filter positioned in the filter compartment, and with the compressive member in an installation configuration.
Figure 26:
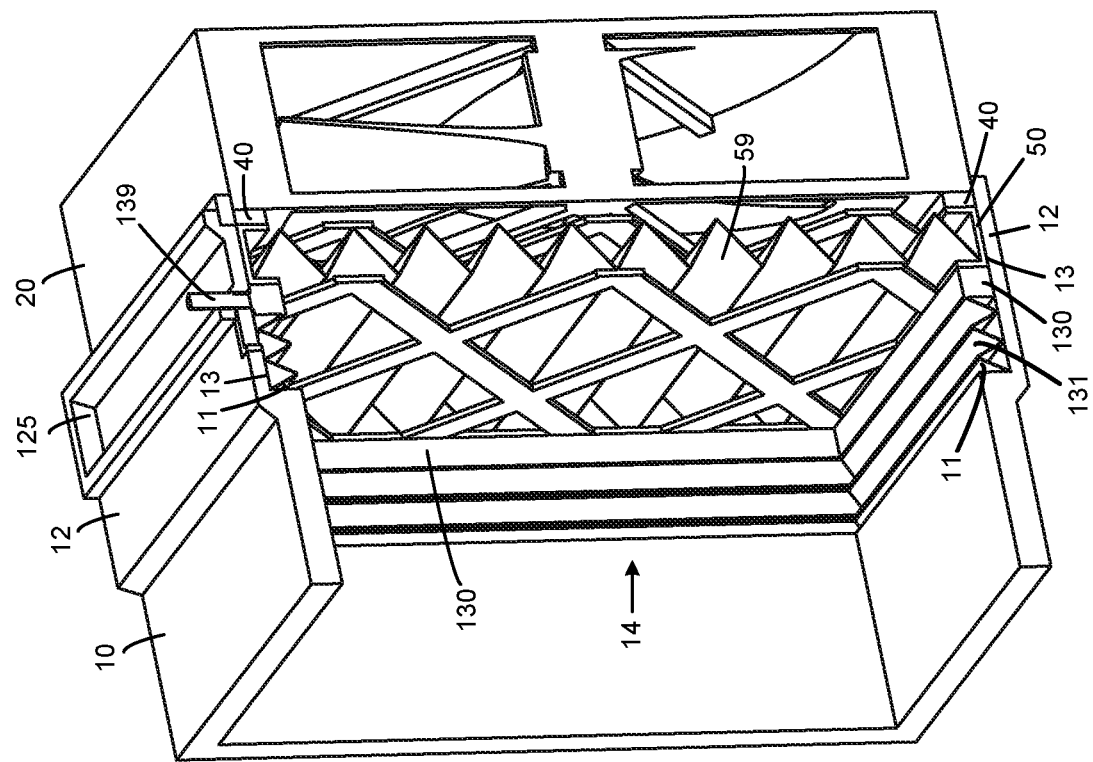
FIG. 26 is a perspective sectional view of the filter assembly, HVAC ductwork section, and fan of FIG. 23, with a filter positioned in the filter compartment, and with the compressive member in an installed configuration.
Figure 27:
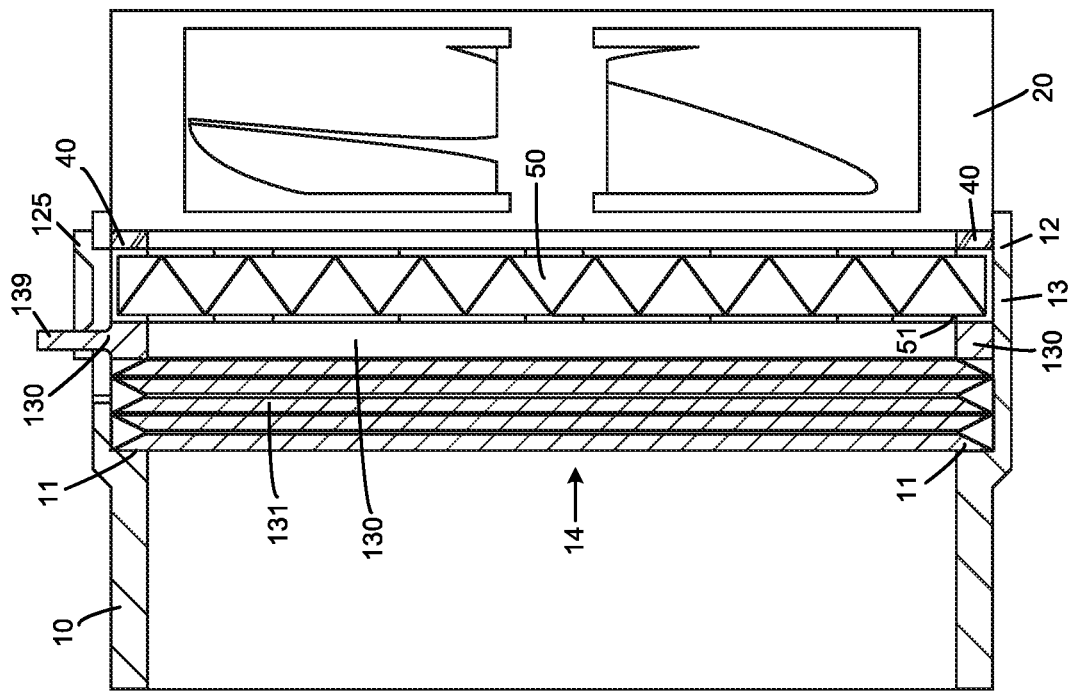
FIG. 27 is a cross-sectional view of the filter assembly, HVAC ductwork section, and fan of FIG. 23, with a filter positioned in the filter compartment, and with the compressive member in an installed configuration.

As exemplified in FIGS. 23 to 27, a post or handle 139, which may be drivingly connected to the rigid frame member, may be accessible from the exterior of filter assembly 100. In this example, after a filter 50 has been positioned in filter compartment 110 (e.g. via slot 120, as illustrated in FIGS. 23 to 25), handle 139 may be used to move compressive member 130 to engage filter 50, as illustrated in FIGS. 26 and 27. Optionally, a sealing member (e.g. an elastomeric lip seal such as a gasket or skirting) may be provided about the travel path of handle 139 to inhibit air from escaping the filter assembly.

As exemplified, pleated skirting 131 is provided between compressive member 130 and an interior ridge 11 that extends around the perimeter of opening 14. An advantage of this configuration is that, where compressive member 130 forms a seal against the upstream face of filter 50, air may be inhibited or prevented from bypassing filter 50 and/or from escaping the filter assembly by skirting 131.

Optionally, the skirting 131 may be made from a resilient material, and biased towards an extended or engaged configuration (e.g. biasing compressive member 130 towards a position that is to be occupied by a filter 50 when the filter is installed in filter compartment 110). Alternatively, or additionally, one or more springs or other biasing members may be incorporated into skirting 131 (e.g., a non-resilient skirting) to bias skirting 131 (and thus compressive member 130) towards an extended configuration. Alternatively or in addition, a biasing member may be drivingly connected to the handle 139.

In the illustrated example, optional sealing gasket 40 is provided between filter 50 and fan 20. In this arrangement, when the filter 50 is engaged by compressive member 130 to press filter 50 against gasket 40, gasket 40 inhibits air from bypassing filter 50 by travelling between filter frame 55 and interior surfaces 13 of filter compartment 110.

Another advantage of this configuration is since one or more sealing members is positioned against the filter after the filter is installed, the sealing member (or members) is not subjected to the filter rubbing against the sealing member and thereby degrading the sealing member each time a filter 50 is removed or replaced in the filter compartment 110.

Optionally, one or more retaining or locking members (not shown) may be provided to maintain the compressive member 130 in an installed configuration (i.e. with the compressive member engaged with a filter 50). For example, a latch may be used to engage handle 139.

Figure 28:
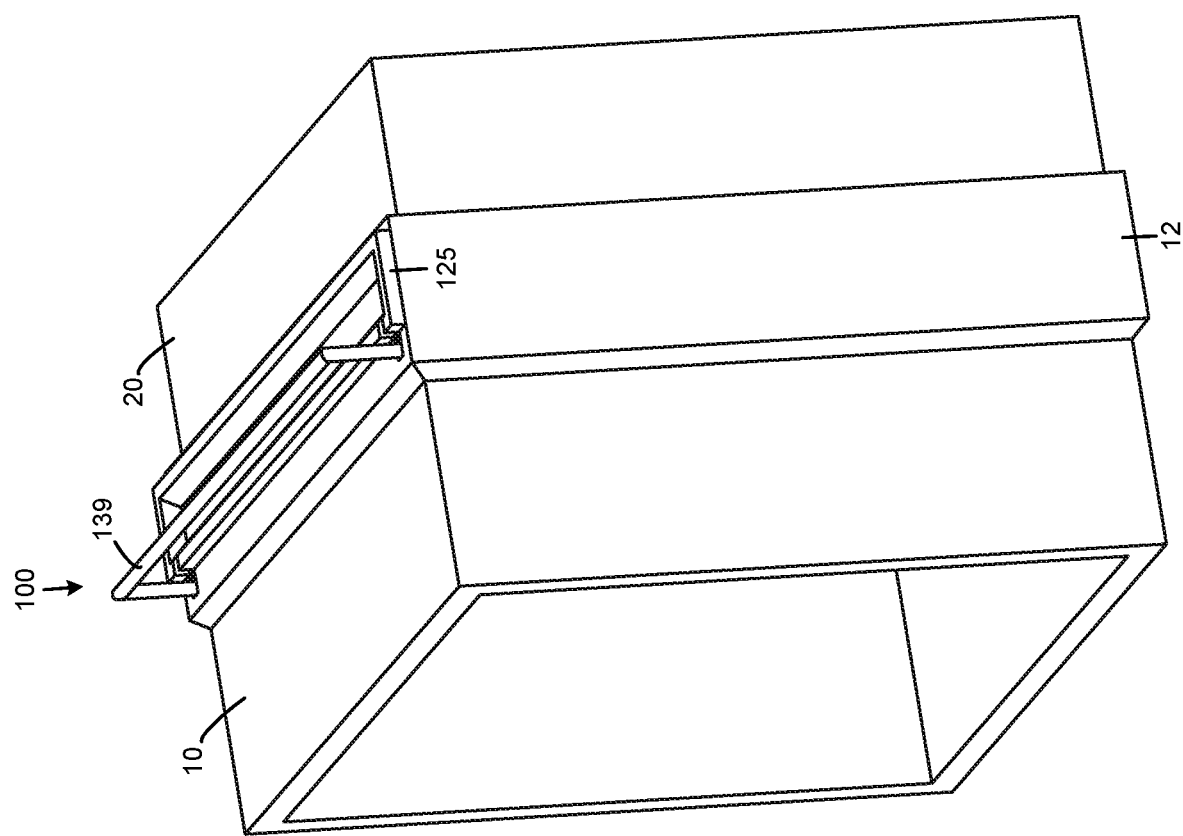
FIG. 28 is a perspective view of a filter assembly, HVAC ductwork section, and fan in accordance with another embodiment, with a filter positioned in the filter compartment, and with a compressive member in an installation configuration.
Figure 29:
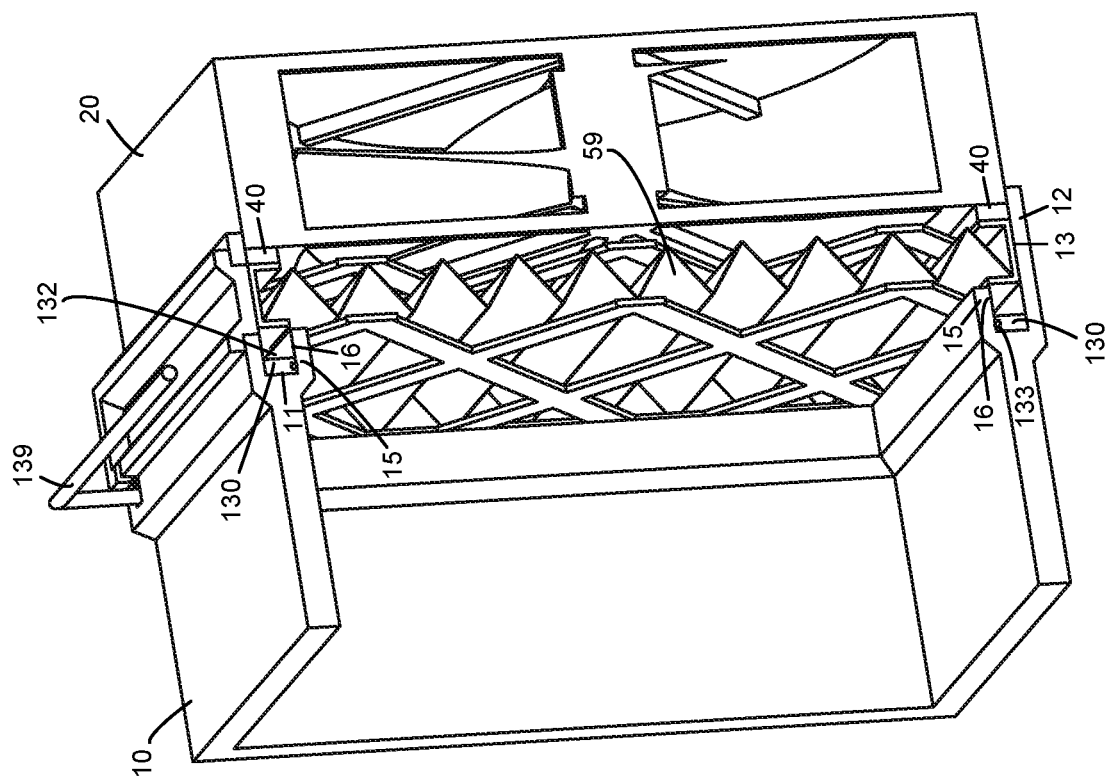
FIG. 29 is a perspective view of the filter assembly, HVAC ductwork section, and fan of FIG. 28, with a filter positioned in the filter compartment, and with the compressive member in an installation configuration.
Figure 30:
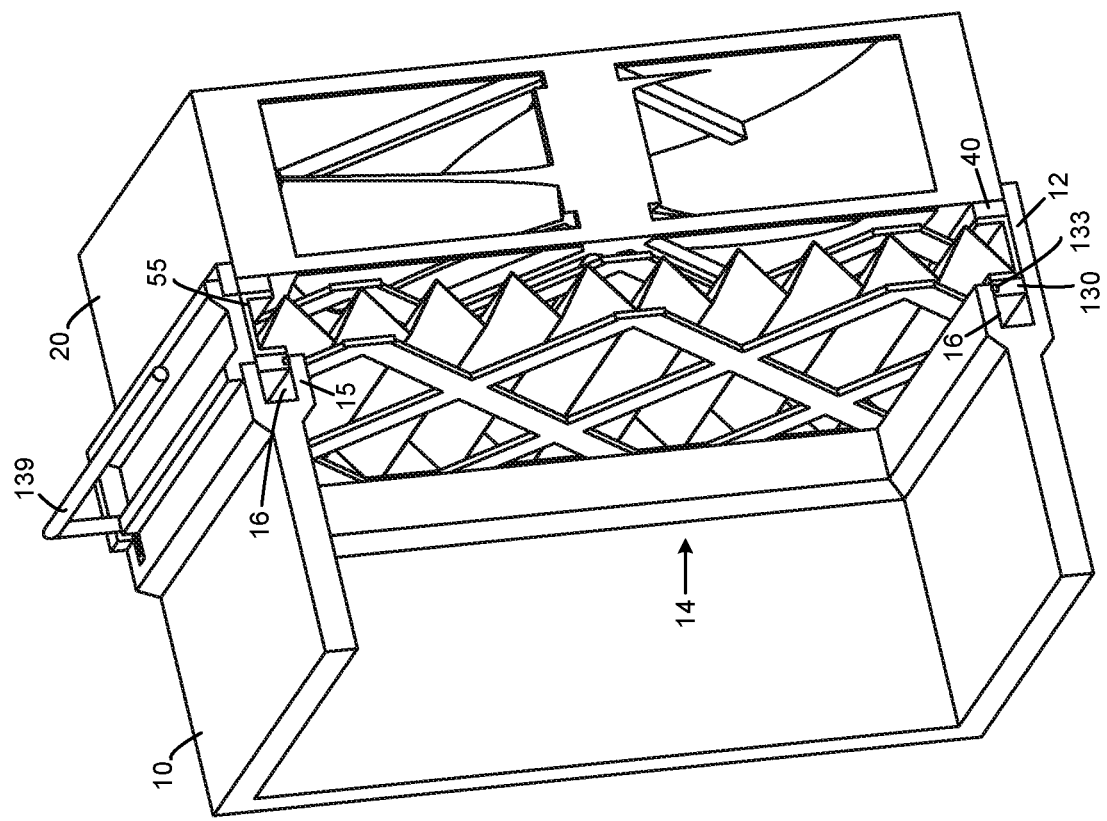
FIG. 30 is a perspective sectional view of the filter assembly, HVAC ductwork section, and fan of FIG. 28, with a filter positioned in the filter compartment, and with the compressive member in an installed configuration.
Figure 31:
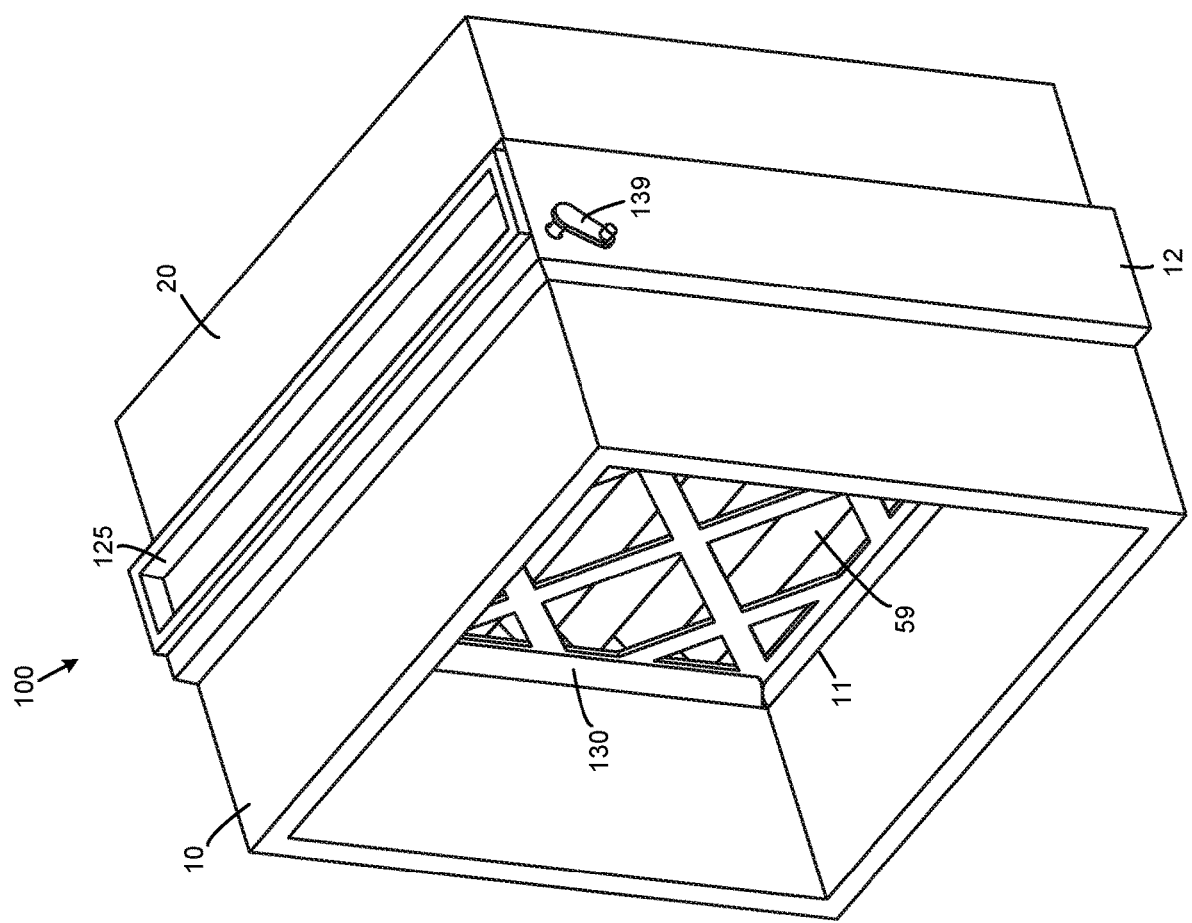
FIG. 31 is a perspective sectional view of a filter assembly, HVAC ductwork section, and fan in accordance with another embodiment, with a filter positioned in the filter compartment, and with a compressive member in an installation configuration.
Figure 32:
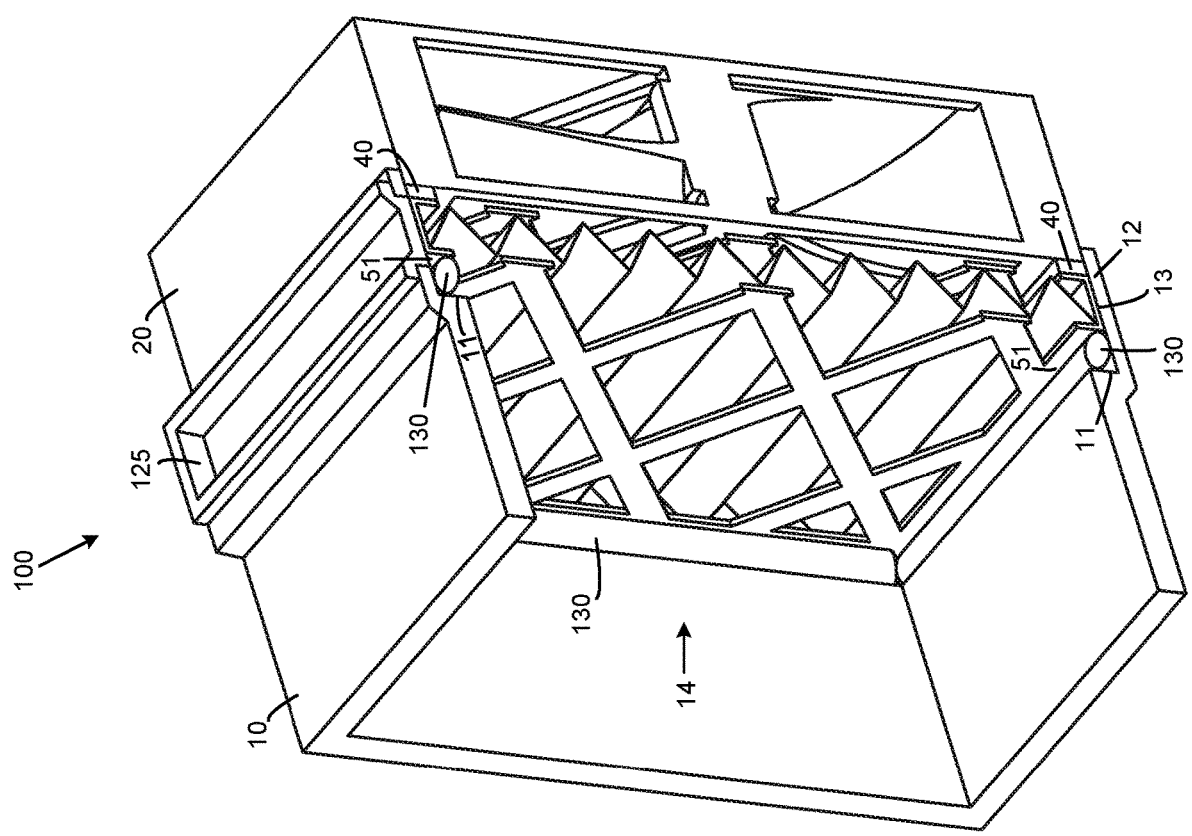
FIG. 32 is a perspective sectional view of the filter assembly, HVAC ductwork section, and fan of FIG. 31, with a filter positioned in the filter compartment, and with the compressive member in an installation configuration.
Figure 33:
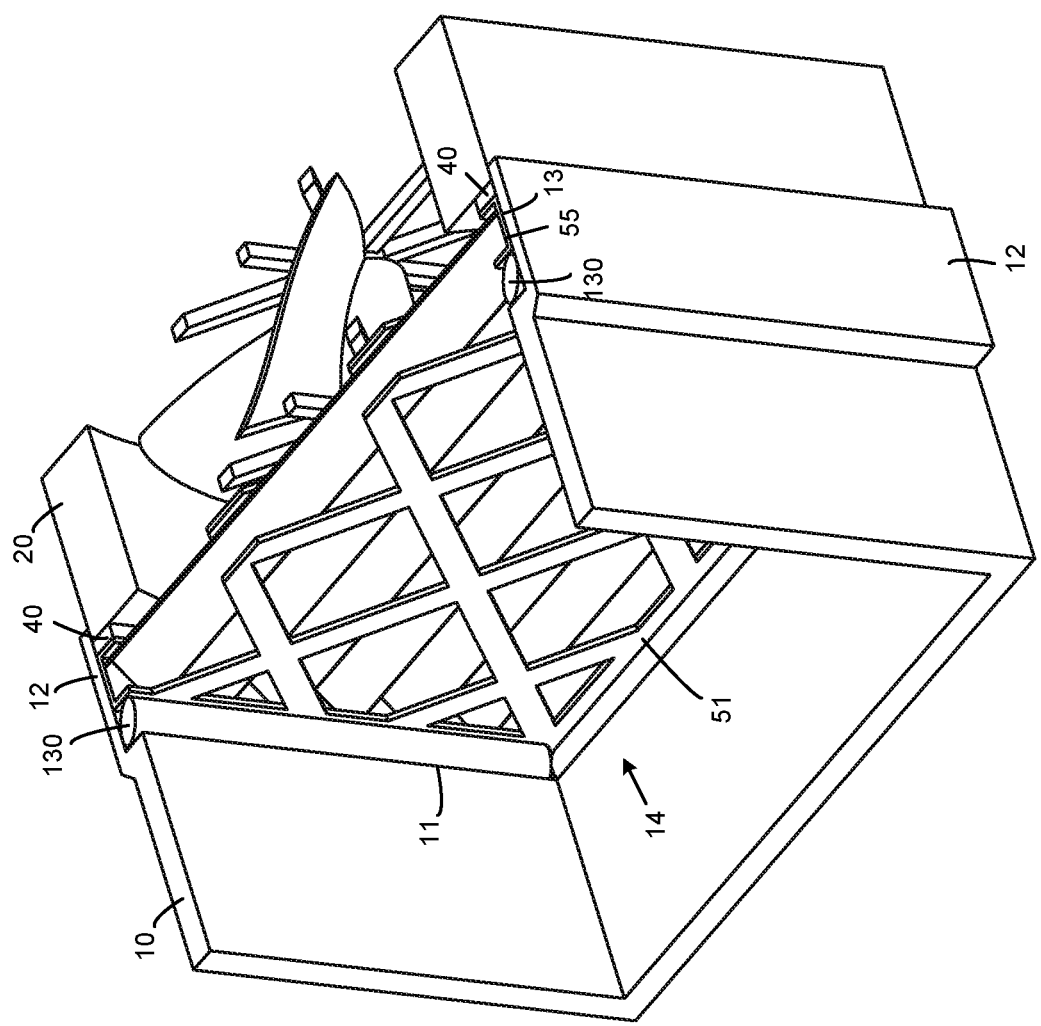
FIG. 33 is a perspective sectional view of the filter assembly, HVAC ductwork section, and fan of FIG. 31, taken along line 33-33, with a filter positioned in the filter compartment, and with the compressive member in an installation configuration.
Figure 34:
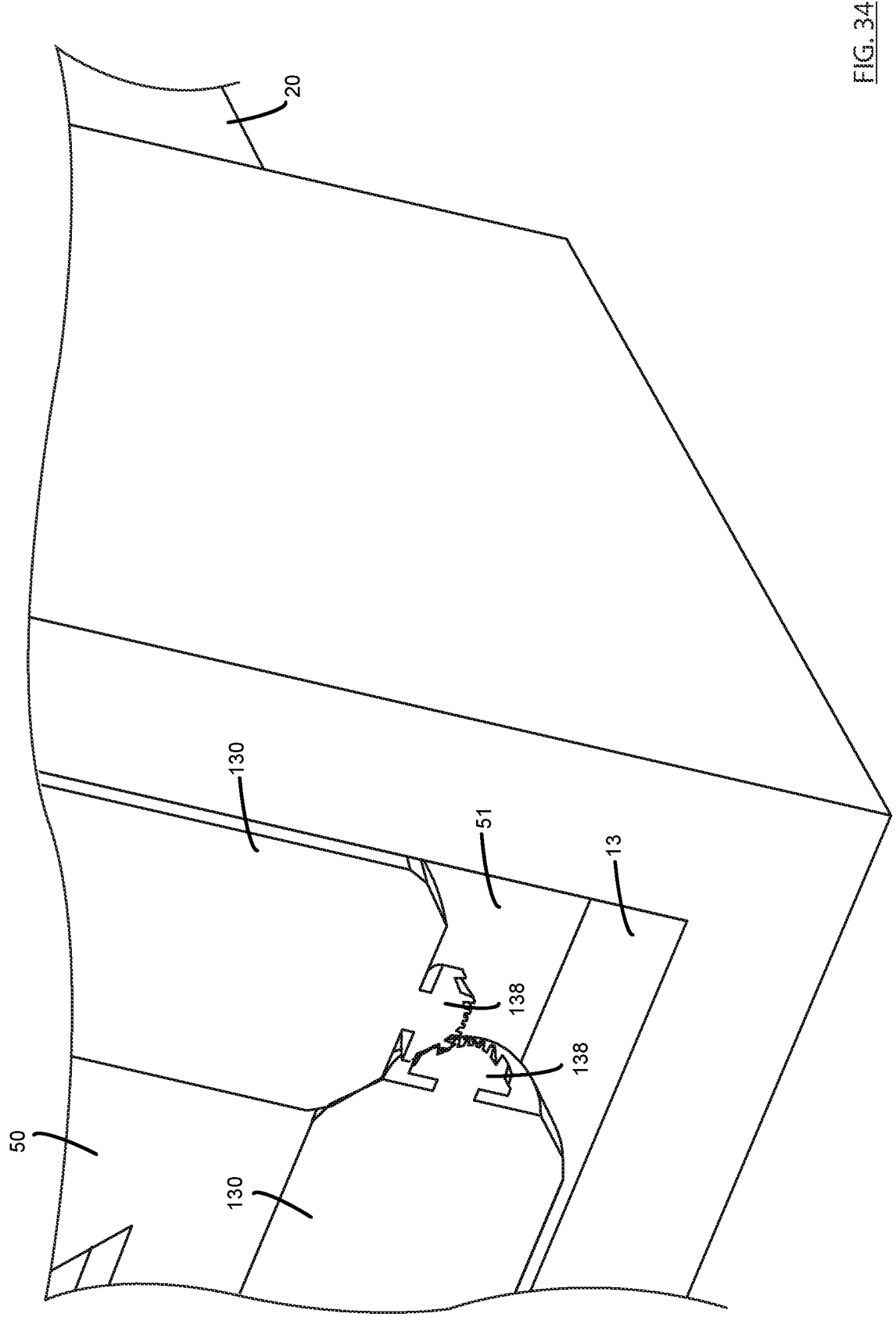
FIG. 34 is a perspective sectional view of a coupling between sections of the compressive member of the filter assembly, HVAC ductwork section, and fan of FIG. 31.
Figure 35:
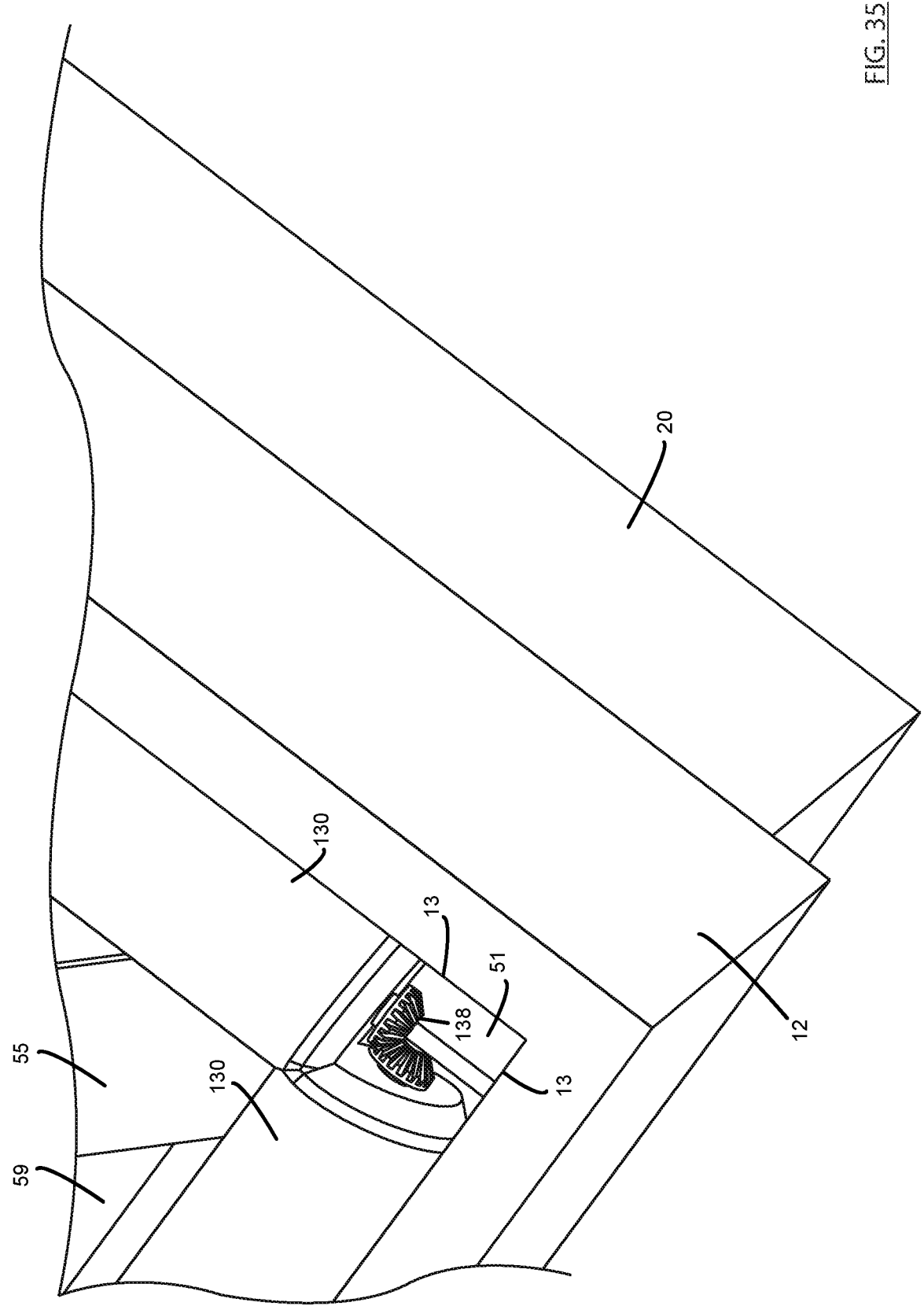
FIG. 35 is a perspective view of the coupling between sections of the compressive member of FIG. 34.

Optionally, as exemplified in FIGS. 28 to 30, a sliding seal (e.g. a wiper seal) is preferably provided between a rigid frame member that comprises the compressive member and the filter assembly to inhibit or prevent air from leaking into or out of the filter assembly when the compressive member has engaged the filter.

Referring to FIGS. 29 and 30, an interior flange 15 is provided about the perimeter of opening 14, and rigid frame member 130 is positioned around and slid along this interior flange. Sliding seal member 133 is provided between compressive member 130 and an interior surface 16 that extends around the perimeter of the interior flange 15. An advantage of this configuration is that air may be inhibited or prevented from bypassing filter 50 by a seal formed between compressive member 130 and filter 50. Additionally, or alternatively, air may be inhibited or prevented from escaping the filter assembly by a seal formed between sliding seal member 133 and interior surface 16 of flange 15. Another advantage of this configuration is that handle 139 is outside the seal created by the sliding sealing member 133, so that the travel path of the handle 139 does not need to be sealed.

As exemplified in FIGS. 31 to 38, alternatively or in addition to sliding, the compressive member may comprise one or more asymmetrical or eccentrically rotatably mounted members that may be rotated into engagement with a filter, thereby forming a seal against the filter and/or pressing the filter against a separate sealing member.

A rotatable compressive member 130 may have any non-circular profile, and/or may be rotated about a non-central axis, such that as the member is rotated, the distance between the axis of rotation of the compressive member and the furthest extent of the compressive member measured in a direction towards the location of a filter may increase. In this way, after a filter is positioned in the filter assembly, the members may be rotated and brought into engagement with the filter.

It will be appreciated that a sealing member such as a gasket or the like may be provided on the portion of the rotatable compressive members 130 that engages the filter. Alternatively, or in addition, as discussed subsequently with reference to FIGS. 39 to 44, all or a portion of the rotatable compressive members 130 that engages the filter may be compressible or deformable. Accordingly rotation of the rotatable compressive members 130 may result in compressive deformation of the members, which may promote the formation of a seal between the compressive members and the filter.

Figure 36:
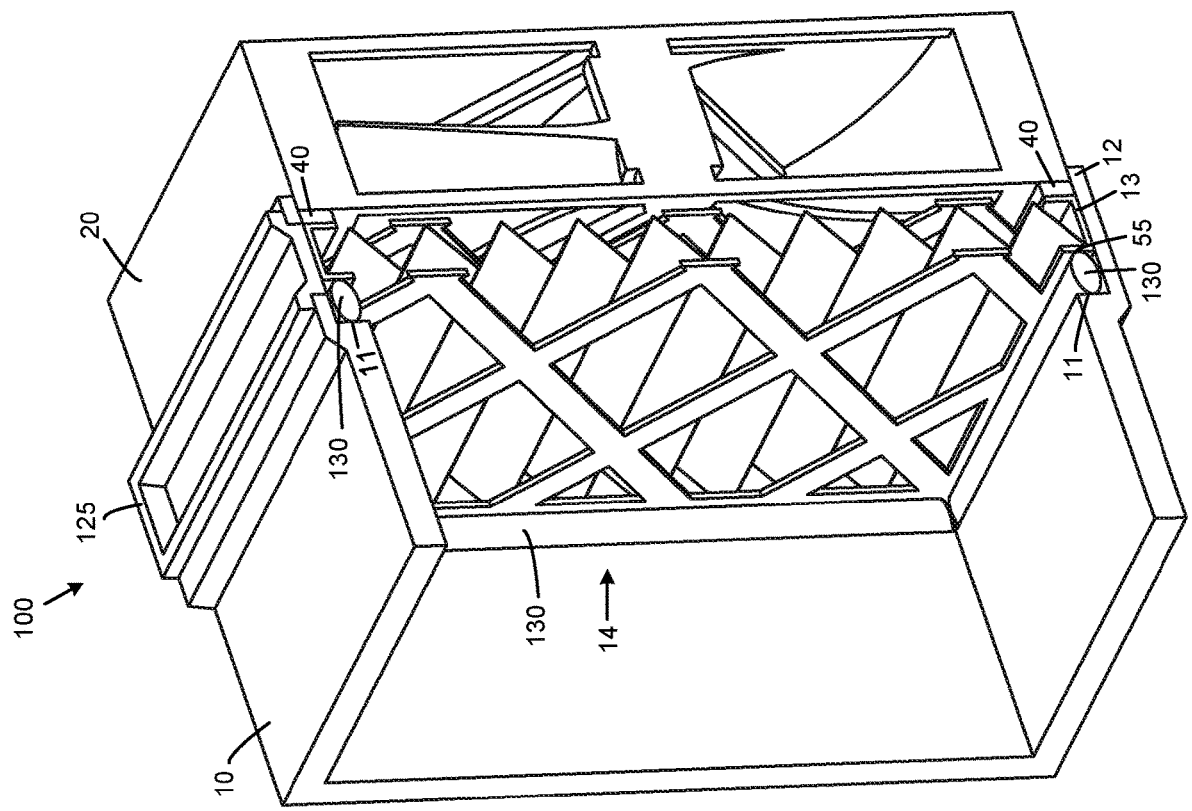
FIG. 36 is a perspective sectional view of the filter assembly, HVAC ductwork section, and fan of FIG. 31, with a filter positioned in the filter compartment, and with the compressive member in an installed configuration.
Figure 37:
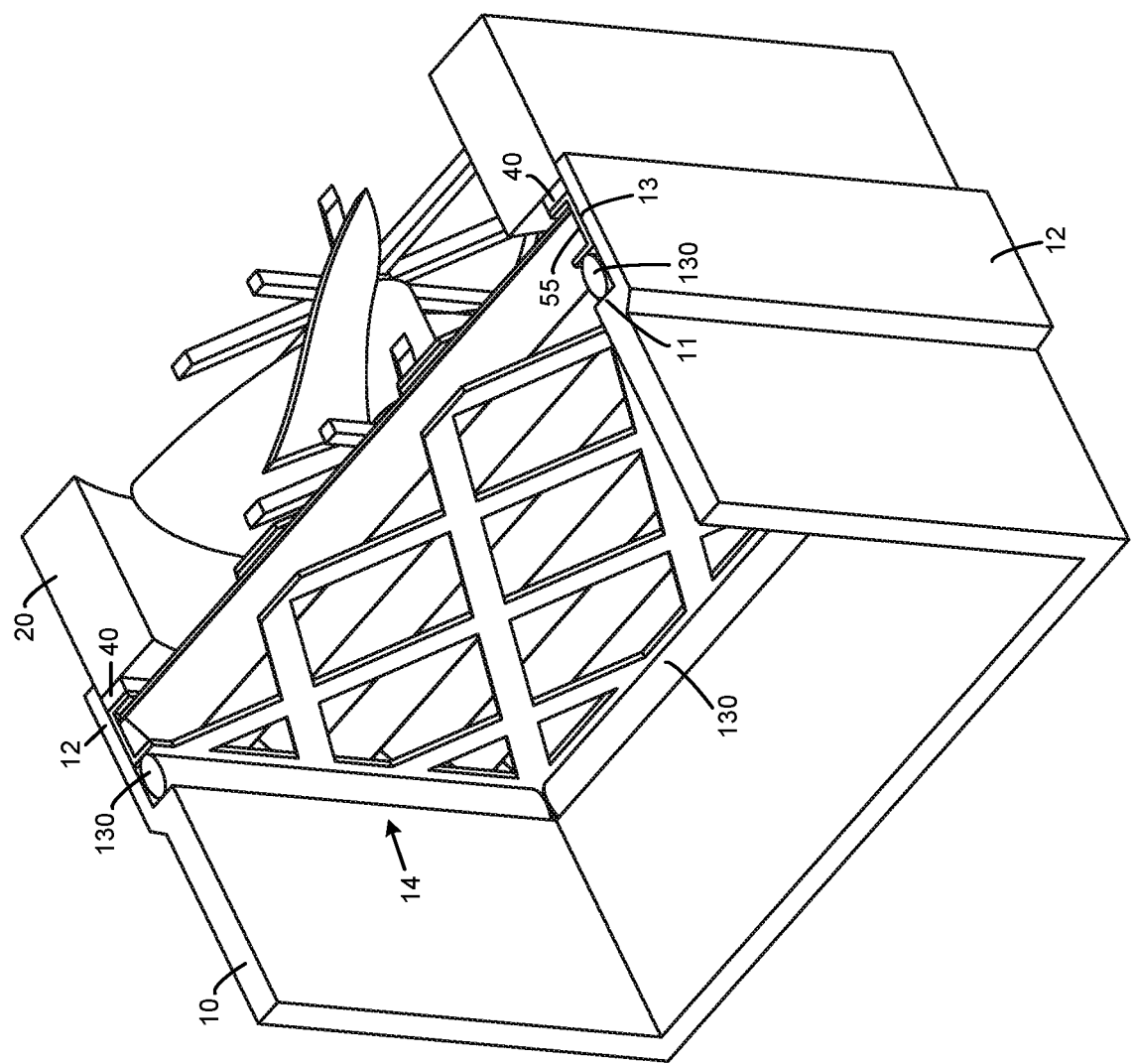
FIG. 37 is a perspective sectional view of the filter assembly, HVAC ductwork section, and fan of FIG. 31, taken along line 37-37, with a filter positioned in the filter compartment, and with the compressive member in an installed configuration.
Figure 38:
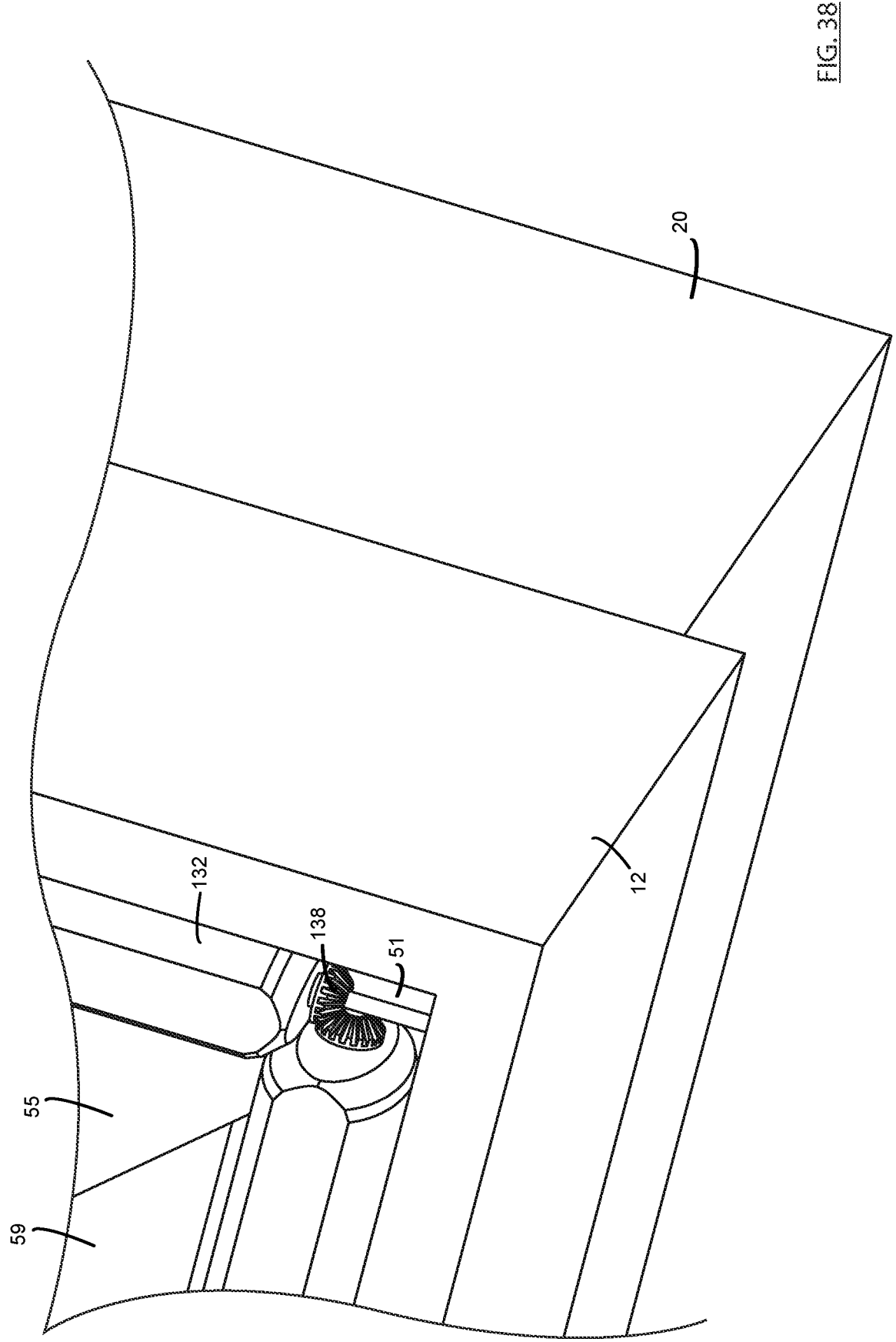
FIG. 38 is a perspective view of the coupling between sections of the compressive member of FIG. 34, with the compressive member in an installed configuration.

As exemplified in FIGS. 31 to 38, a filter assembly 100 has compressive members 130 mounted such that they may each be rotated about a respective longitudinal axis. In this example, after a filter 50 has been positioned in filter compartment 110, e.g. as illustrated in FIGS. 31 to 35, compressive members 130 may be rotated to engage filter 50, as illustrated in FIGS. 36 to 38.

As exemplified, rotatable compressive members 130 may be coupled to each other via bevel gears 138 so that they may be rotated collectively via a handle 139 accessible from the exterior of filter assembly 100. An advantage of this configuration is that a single handle 139 may be used to rotate the compressive members 130 into engagement with a filter 50 positioned in the filter compartment 110. Alternatively, compressive members 130 may be rotatable individually.

As exemplified, rotatable compressive members 130 have a generally elliptical cross-sectional shape, and are rotated towards a position in which a major axis of the cross-section is generally perpendicular with the face of filter 50 that it engages. It will be appreciated that rotatable compressive members 130 may have any other suitable cross-sectional shape. For example, the compressive members may have a non-circular profile (e.g., triangular or rectangular cross-sectional profiles). Alternatively, the members may have generally circular cross-sections, but their axes of rotation may be offset from the center of the circle.

As exemplified, handle 139 may be used to manually rotate compressive members 130. Alternatively, or additionally, a motor (e.g. an electric motor) may be used to selectively rotate compressive members 130.

As discussed previously, FIGS. 39 to 44 exemplify the use of rotatable and bendable or deformable compressive members. As exemplified, compressive members 130 may have a rectangular or otherwise generally elongate cross-sectional profile.

The rotatable compressive members 130 may be rotated from a first position in which the shorter sides of the rectangle are aligned with the direction of air flow through the filter assembly, and towards a second position in which the longer sides of the rectangle are aligned with the direction of air flow. It will be appreciated that rotatable compressive members 130 may have any other suitable cross-sectional shape.

Figure 44:
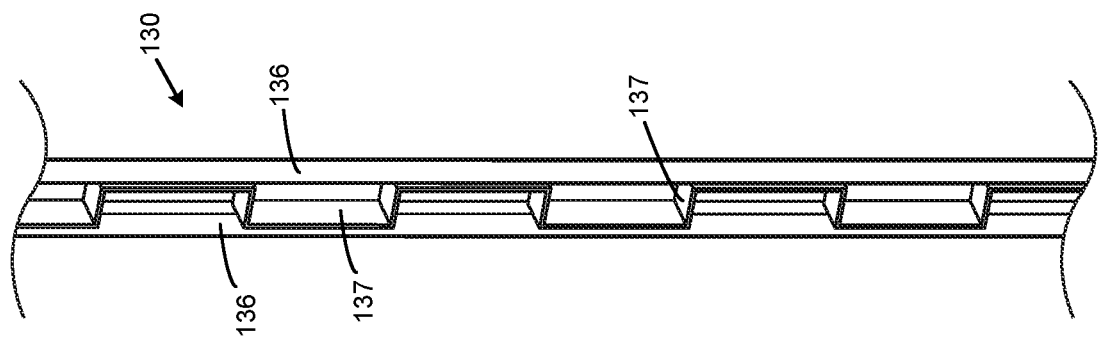
FIG. 44 is a perspective view of a compressive member of the filter assembly, HVAC ductwork section, and fan of FIG. 39.
Figure 45:
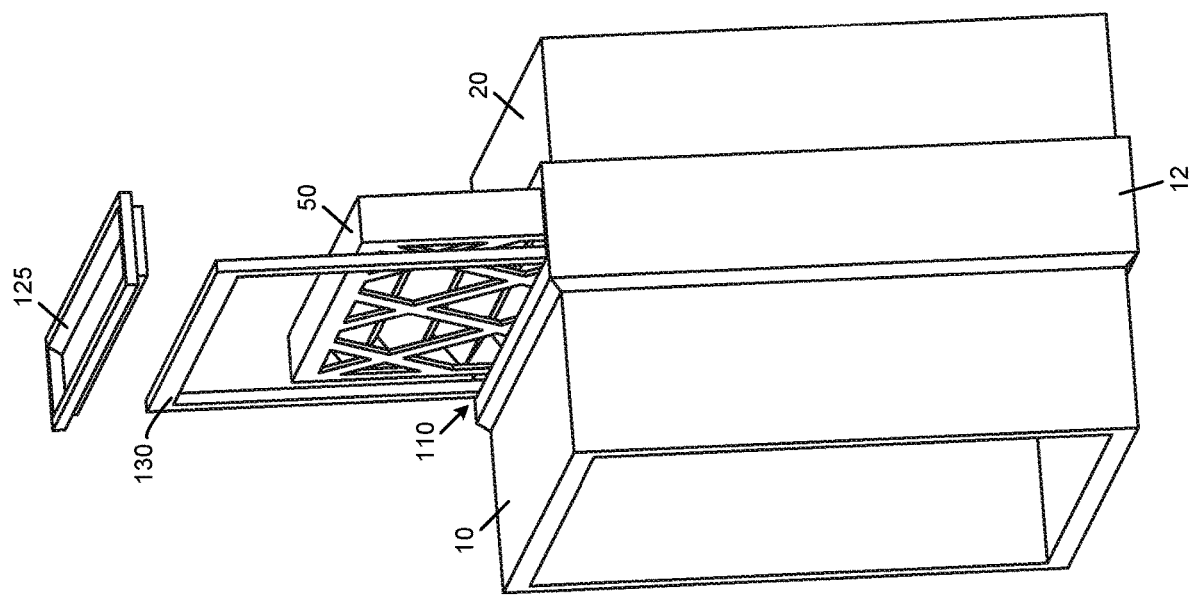
FIG. 45 is a perspective view of a filter assembly, HVAC ductwork section, and fan in accordance with another embodiment, with a filter partially positioned in the filter compartment, and with a compressive member partially positioned in the filter compartment.
Figure 46:
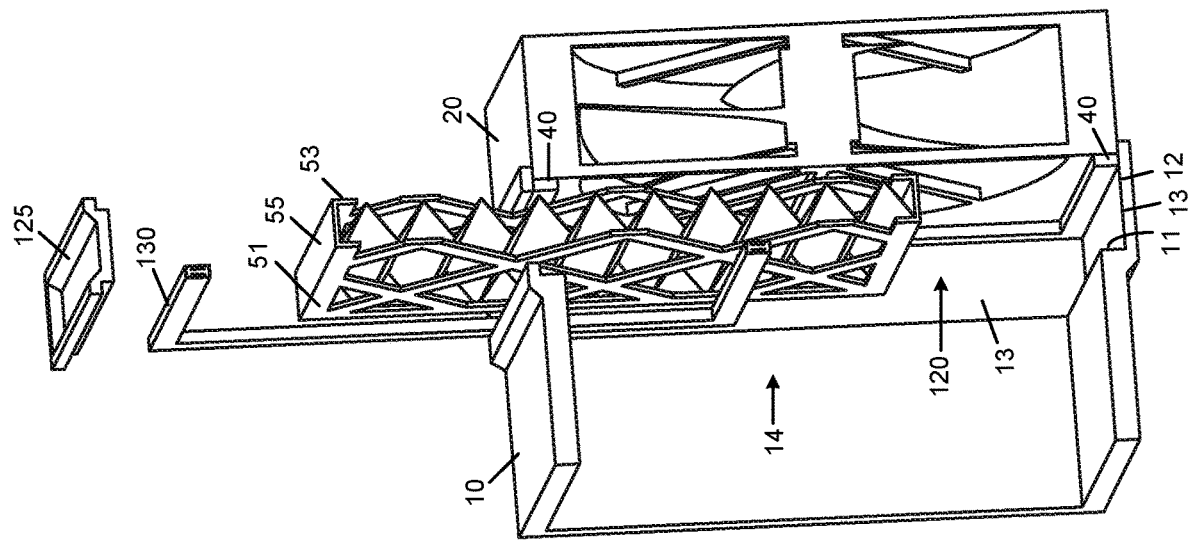
FIG. 46 is a perspective sectional view of the filter assembly, HVAC ductwork section, and fan of FIG. 45, with a filter partially positioned in the filter compartment, and with the compressive member partially positioned in the filter compartment.

As illustrated in FIG. 44, bendable compressive members 130 may include one or more spring members 137 positioned interior of an elastomeric outer layer 136. An advantage of this design is that spring member 137, while bendable, may provide rigidly and/or resiliency to bendable compressive member 130, which may improve the force transfer and/or seal when the bendable compressive member 130 is rotated to engage a filter 50. For example, after a filter is positioned in the filter assembly, the members may be rotated and brought into engagement with the filter. As the members are bendable, further rotation of the members may result in bending (and optionally compressive deformation) of the members, which may promote the formation of a seal between the compressive members and the filter. Accordingly, as compressive member 130 is rotated further after initially contacting filter 50, resilient spring member(s) 137 may be stretched and/or compressed into a position in which, as they attempt to return to an un-stretched/un-compressed condition, they urge the elastomeric outer layer 136 towards the surface of filter 50.

Spring member 137 may be made from any suitable resilient material, such as spring steel, stainless steel, nylon, polypropylene or acrylonitrile butadiene styrene (ABS).

In the illustrated example, spring member 137 has a profile resembling a square wave. Alternatively, spring member may have any other suitable profile.

As exemplified in FIGS. 45 to 48, alternatively or in addition to sliding and or being rotatable, the compressive member may comprise one or more insertable members. In such an embodiment, the compressive member may be a separate unit that is inserted into the filter assembly concurrently with (or before or after) the insertion of a filter into the filter assembly. An advantage of this design is that it may simplify the design and/or reduce the cost of the filter assembly. Additionally, or alternatively, it may simplify the repair or replacement of a defective compressive member.

As exemplified in FIGS. 45 to 48, compressive member 130 is a separate unit that is inflatable. Accordingly, once a filter 50 and the compressive member 130 have been positioned in filter compartment 110, e.g. as illustrated in FIG. 47, compressive member 130 may be adjusted to engage filter 50, as illustrated in FIG. 48.

As exemplified, an inflatable compressive member 130 has a central frame member 135 that provides support for an outer elastomeric layer 136. By introducing a fluid (i.e., a gas or a liquid) into one or more cavities 134 enclosed by frame member 135 and outer layer 136, the compressive member 130 may be inflated, e.g. until it comes into contact with both filter 50 and a perimeter of opening 14 of filter compartment 110 (e.g. with interior ridge 11).

Alternately, an insertable compressive 130 may be a non-inflatable elastomeric member. For example, compressive member 130 may have a slightly wedge-shaped profile, and the narrow end of the compressive member may be inserted first if the compressive member is positioned in the filter assembly after the filter has been positioned in the filter assembly, or the wide end of the compressive member may be inserted first if the compressive member is positioned in the filter before the filter has been positioned in the filter assembly. An advantage of this design is that a non-inflatable compressive member may be simpler to install, more reliable, and/or less expensive to produce than an inflatable compressive member.

It will be appreciated that an insertable compressive member 130, whether inflatable or not, may be moveable as disclosed herein.

Filter Assembly with Upstream and Downstream Compressive Members

A filter assembly 100 may have compressive members 130 provided on each of the upstream and downstream sides of a filter assembly (i.e., a first compressive member engages the upstream face of a filter and a second compressive member engages the downstream face of the same filter). An advantage of this design is that air is inhibited from bypassing the filter and, in addition, air is inhibited from exiting the HVAC ducting via the filter assembly.

The compressive members may be any of those disclosed herein. The compressive members on each of the upstream and downstream sides of the filter may be the same or different and they may be individually moveable or concurrently moveable (e.g., by a common actuator).

Figure 16:
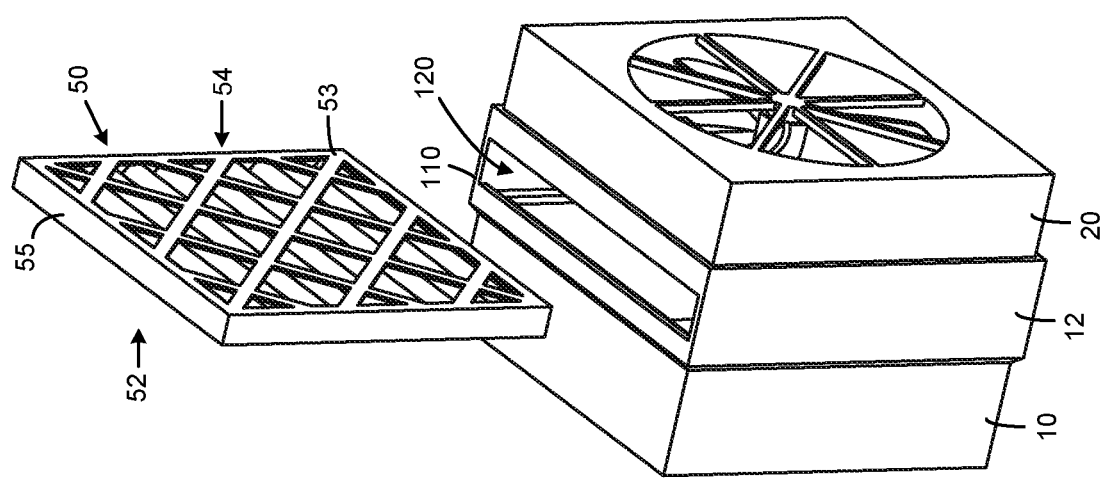
FIG. 16 is a perspective view of a filter assembly, HVAC ductwork section, and fan in accordance with another embodiment, with a filter positioned exterior to the filter compartment, and with compressive members in an installation configuration.
Figure 17:
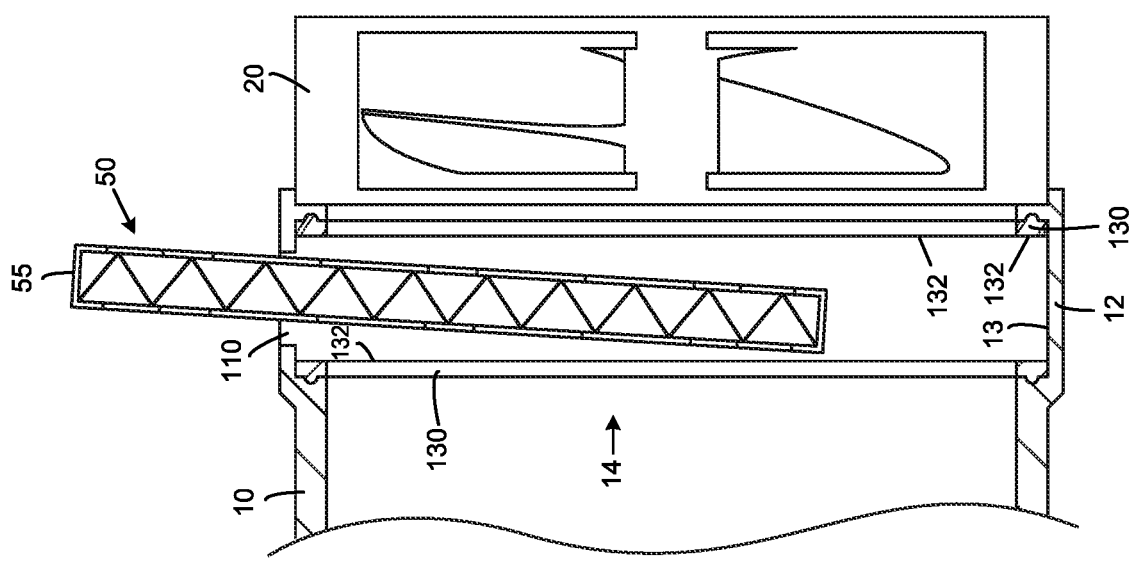
FIG. 17 is a cross-sectional view of the filter assembly, HVAC ductwork section, and fan of FIG. 16, with a filter partially positioned in the filter compartment, and with the compressive members in an installation configuration.
Figure 18:
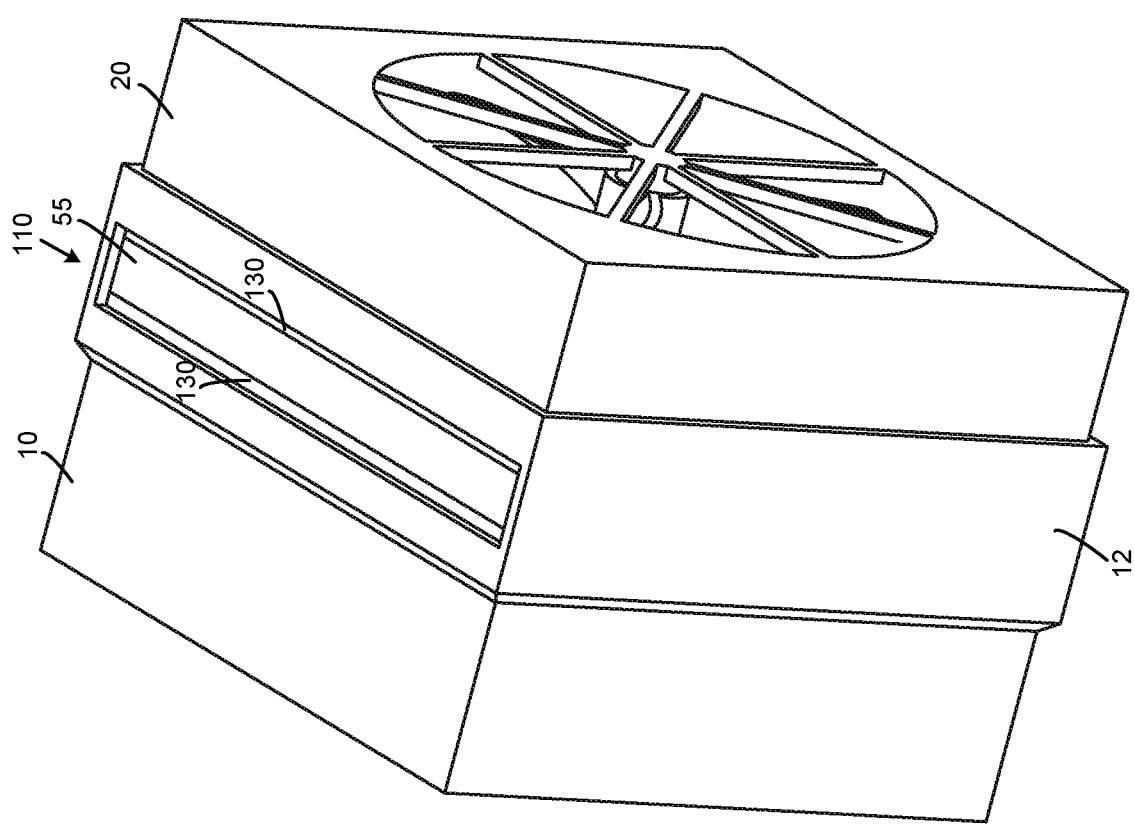
FIG. 18 is a perspective view of the filter assembly, HVAC ductwork section, and fan of FIG. 16, with a filter positioned in the filter compartment, and with the compressive members in an installation configuration.
Figure 19:
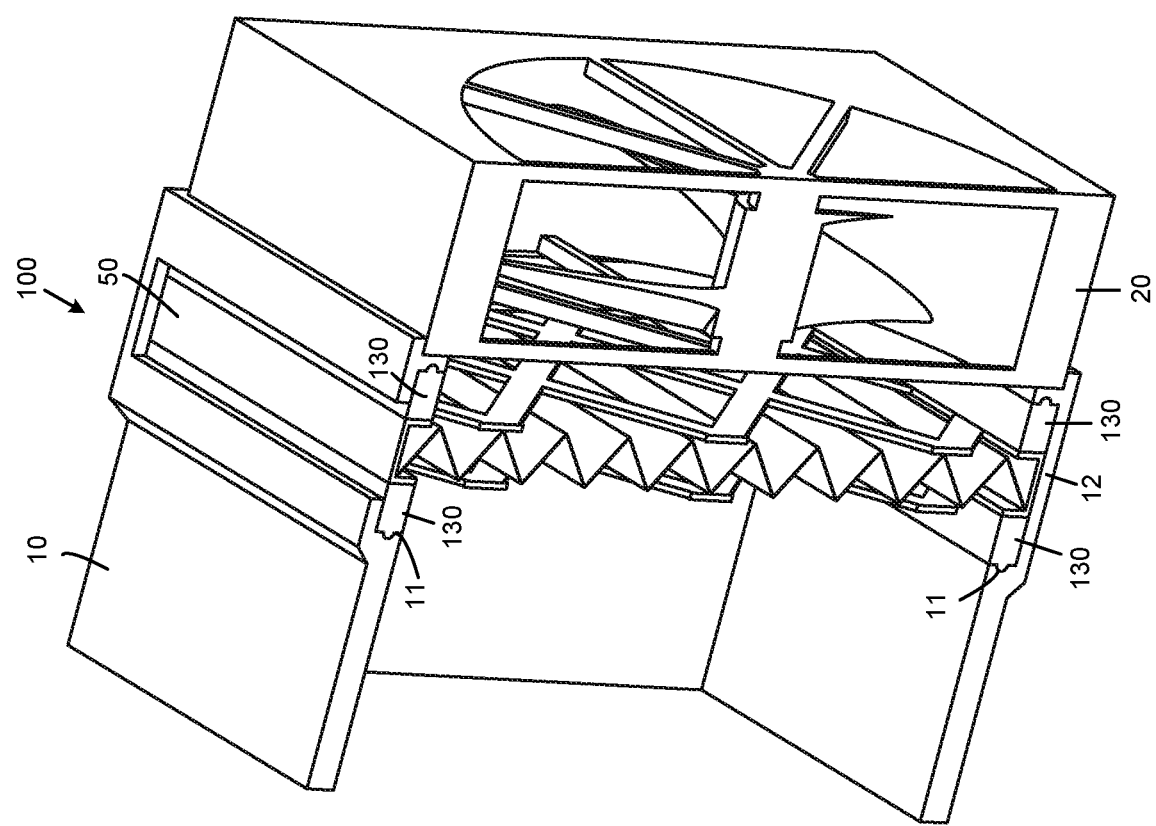
FIG. 19 is a perspective sectional view of the filter assembly, HVAC ductwork section, and fan of FIG. 16, with a filter positioned in the filter compartment, and with the compressive members in an installation configuration.
Figure 20:
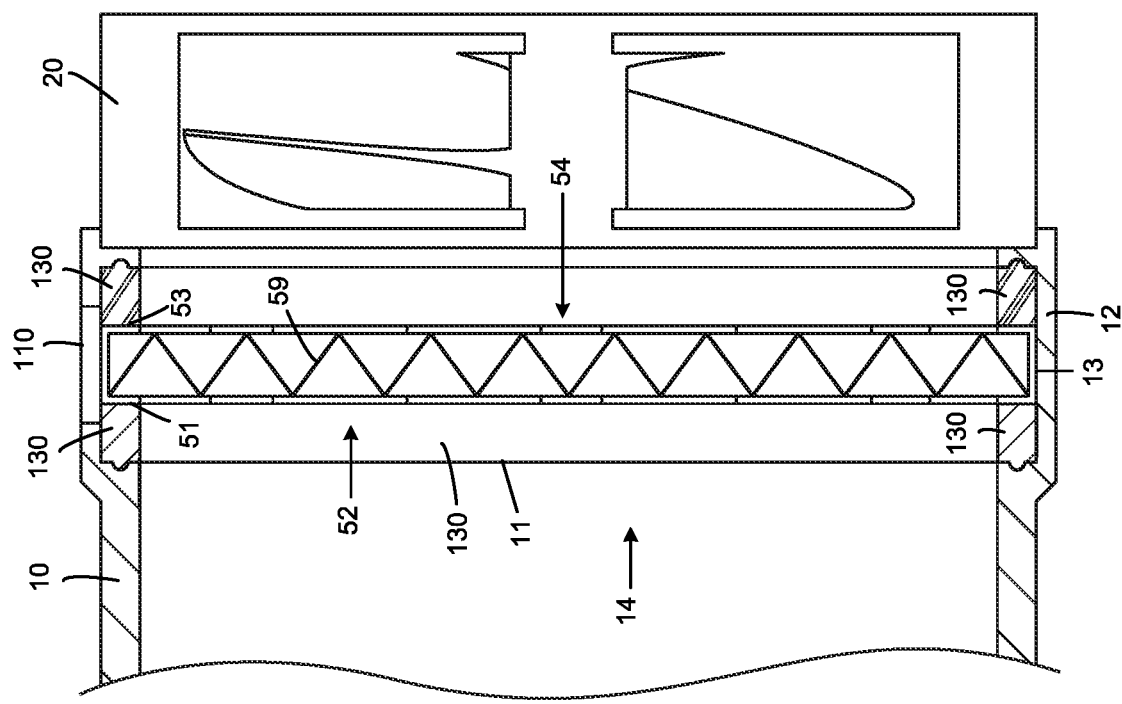
FIG. 20 is a cross-sectional view of the filter assembly, HVAC ductwork section, and fan of FIG. 16, with a filter positioned in the filter compartment, and with the compressive members in an installation configuration.
Figure 21:
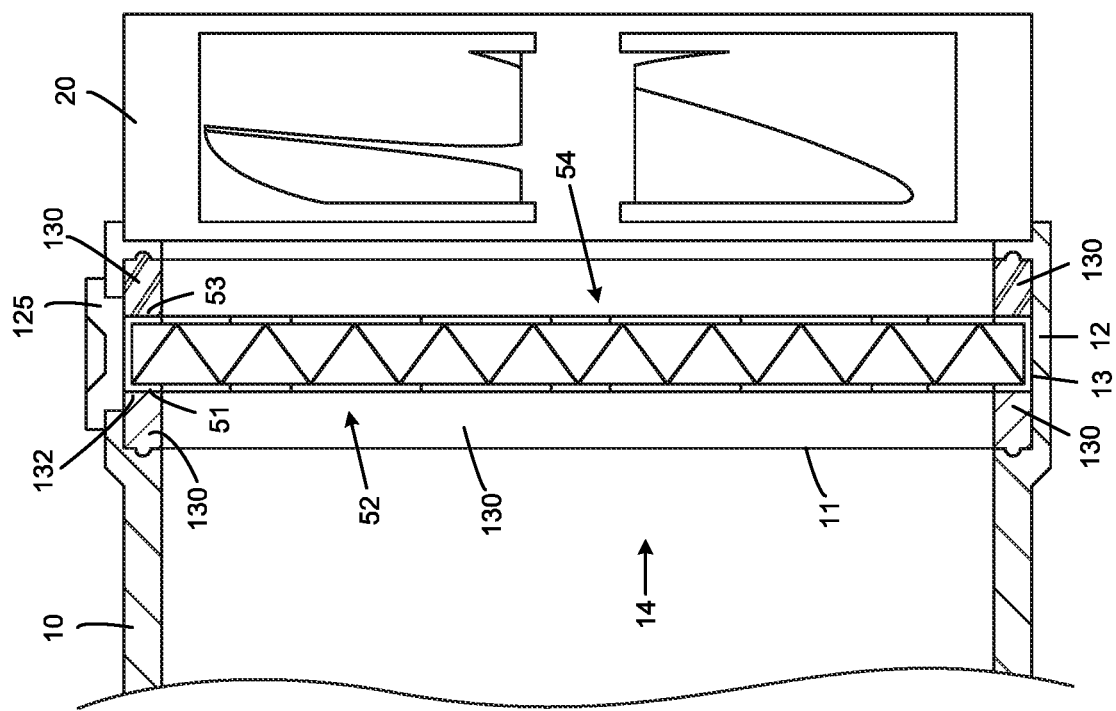
FIG. 21 is a cross-sectional view of the filter assembly, HVAC ductwork section, and fan of FIG. 16, with a filter positioned in the filter compartment, with the compressive members in an installed configuration, and with an optional lid.
Figure 22:
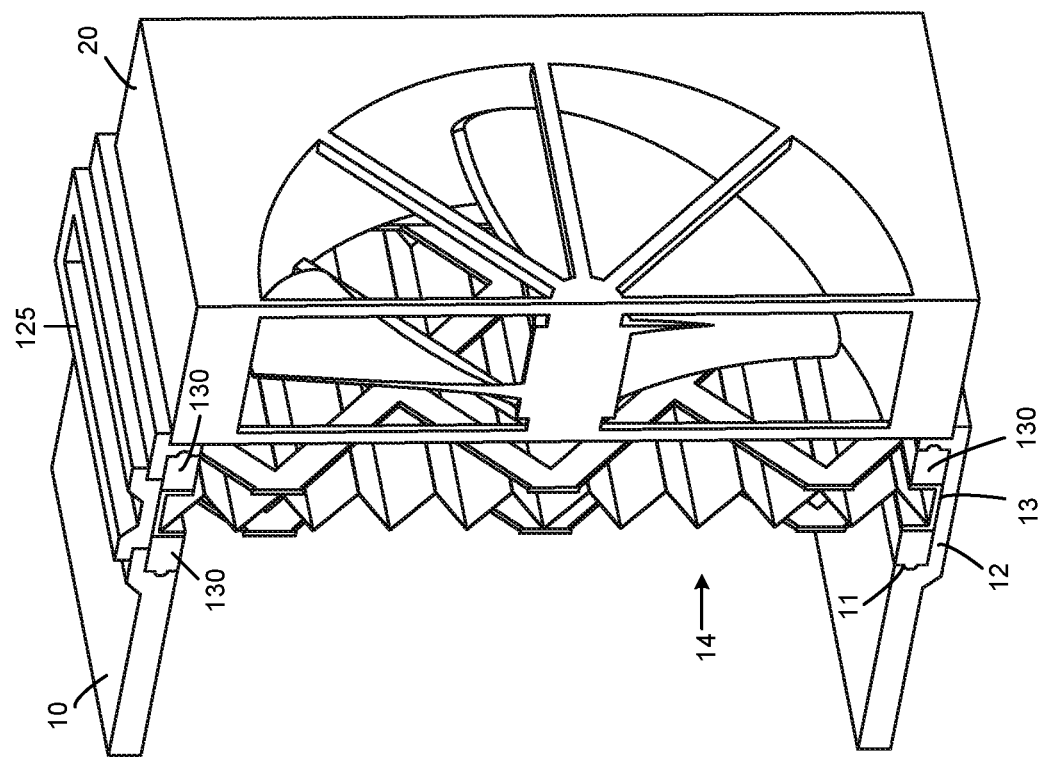
FIG. 22 is a cross-sectional view of the filter assembly, HVAC ductwork section, and fan of FIG. 16, with a filter positioned in the filter compartment, with the compressive members in an installed configuration, and with an optional lid.

As exemplified in FIGS. 16 to 22, a first compressive member 130 may be provided proximate the opening 14 between conduit 10 and filter compartment 110, to engage a first or upstream face of filter 50, and a second compressive member 130 may be provided to engage a second or downstream face of the same filter 50. Accordingly, after a filter 50 has been positioned in filter compartment 110 (e.g. via slot 120, as illustrated in FIGS. 16 and 17), compressive members 130 may be concurrently or sequentially adjusted to engage opposing faces of filter 50, as illustrated in FIGS. 18 to 22.

In the illustrated example, when the filter 50 is engaged by compressive members 130, a seal may be formed between the upstream compressive member and a first face 52 of filter 50 (e.g. face 51 of filter frame 55), and/or between the downstream compressive member and a second face 54 of filter 50 (e.g. face 53 of filter frame 55). One or both of these seals may inhibit air from bypassing filter 50 or exiting the HVAC ducting by travelling between filter frame 55 and interior surfaces 13 of filter compartment 110.

Figure 39:
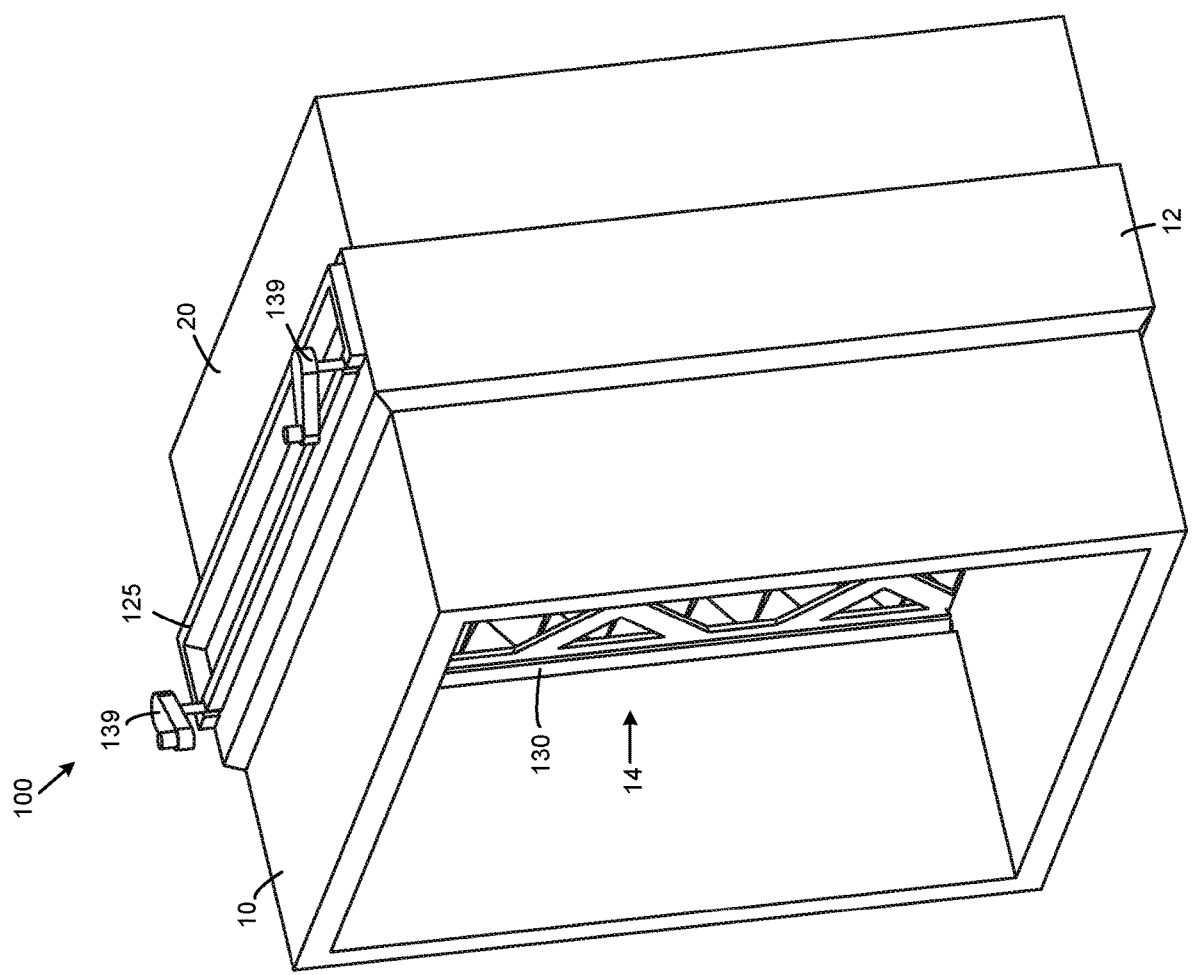
FIG. 39 is a perspective view of a filter assembly, HVAC ductwork section, and fan in accordance with another embodiment, with a filter positioned in the filter compartment, and with compressive members in an installed configuration.
Figure 40:
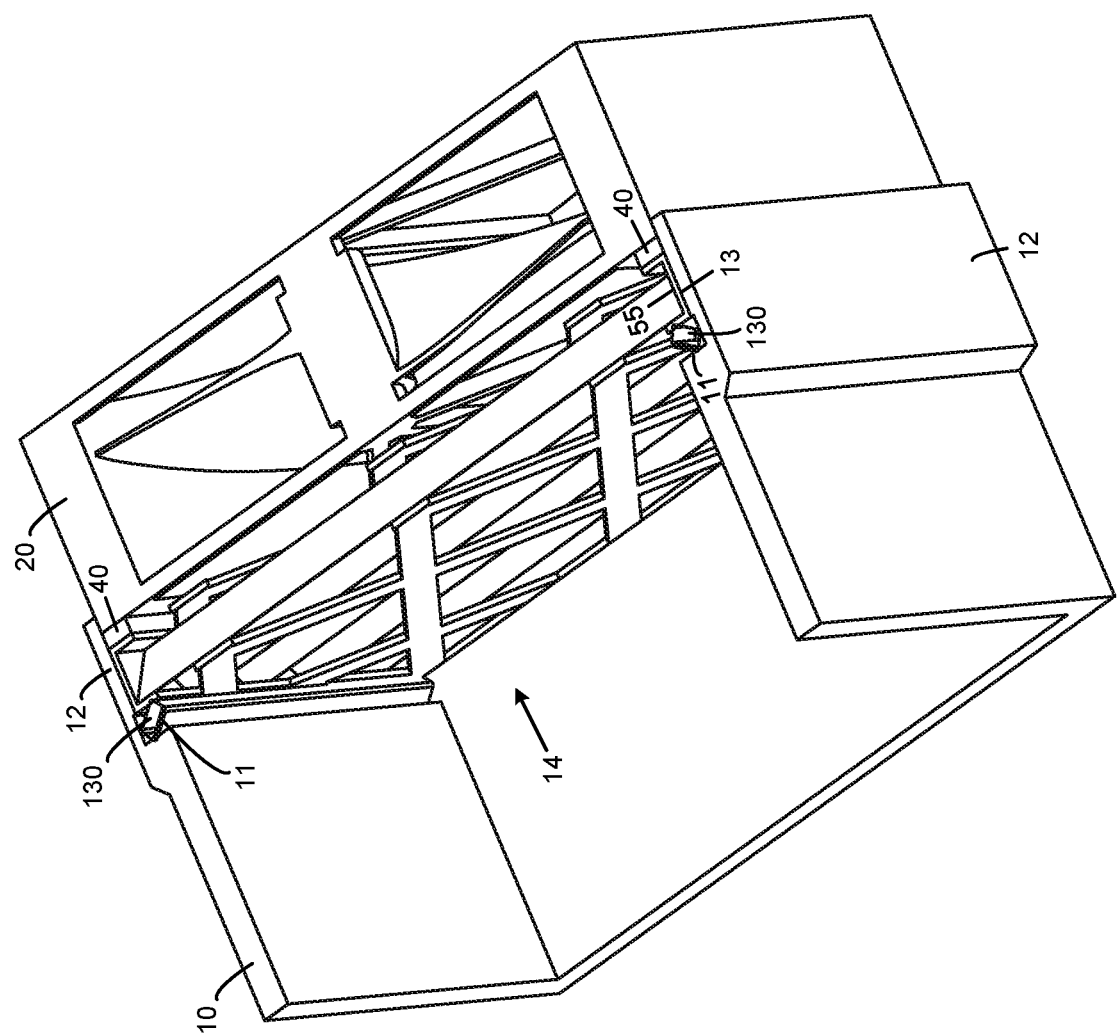
FIG. 40 is a perspective sectional view of the filter assembly, HVAC ductwork section, and fan of FIG. 39, taken along line 40-40, with a filter positioned in the filter compartment, and with the compressive members in an installed configuration.
Figure 41:
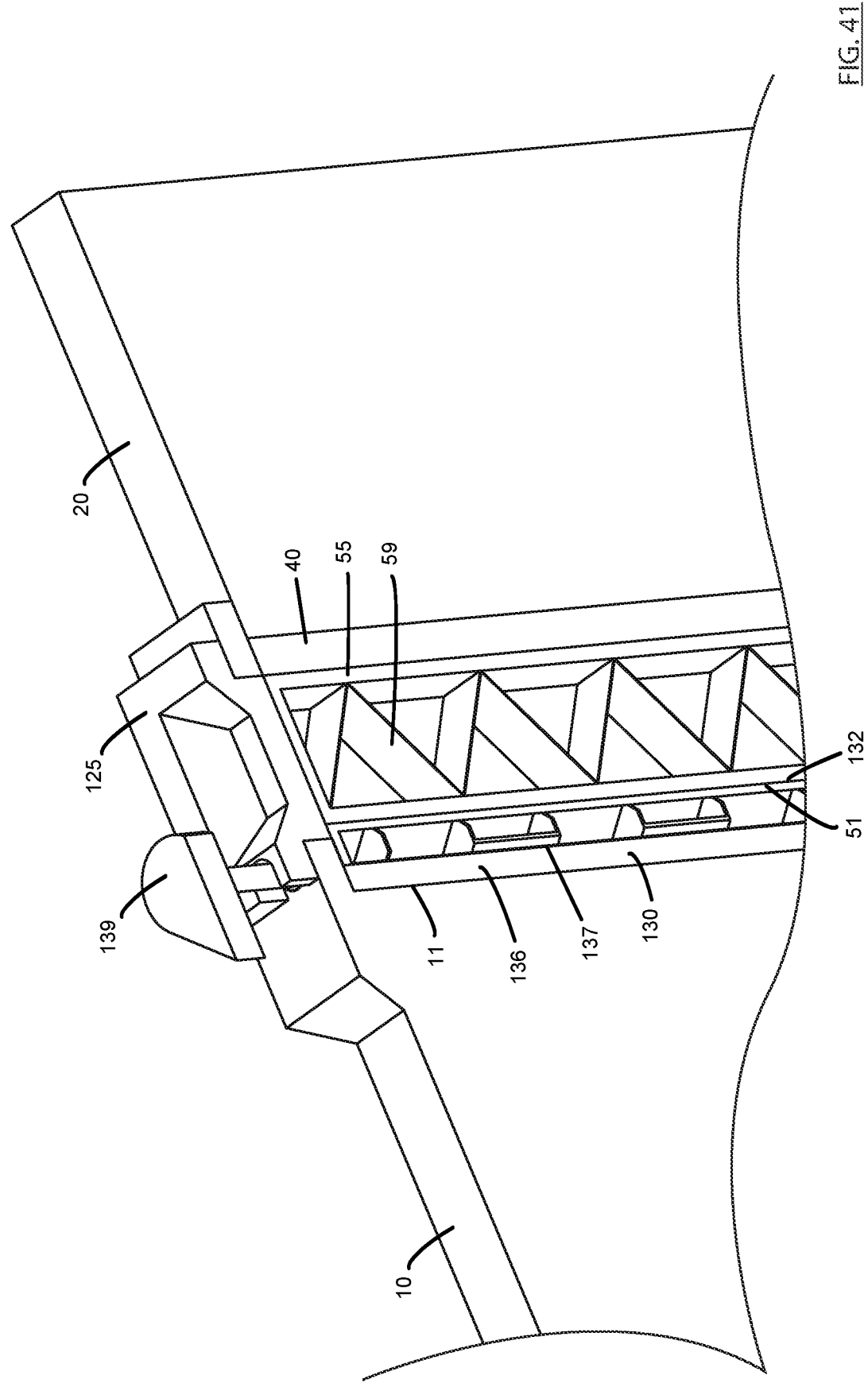
FIG. 41 is a perspective sectional view of a portion of the filter assembly, HVAC ductwork section, and fan of FIG. 39, taken along line 41-41, with a filter positioned in the filter compartment, and with the compressive members in an installed configuration.
Figure 42:
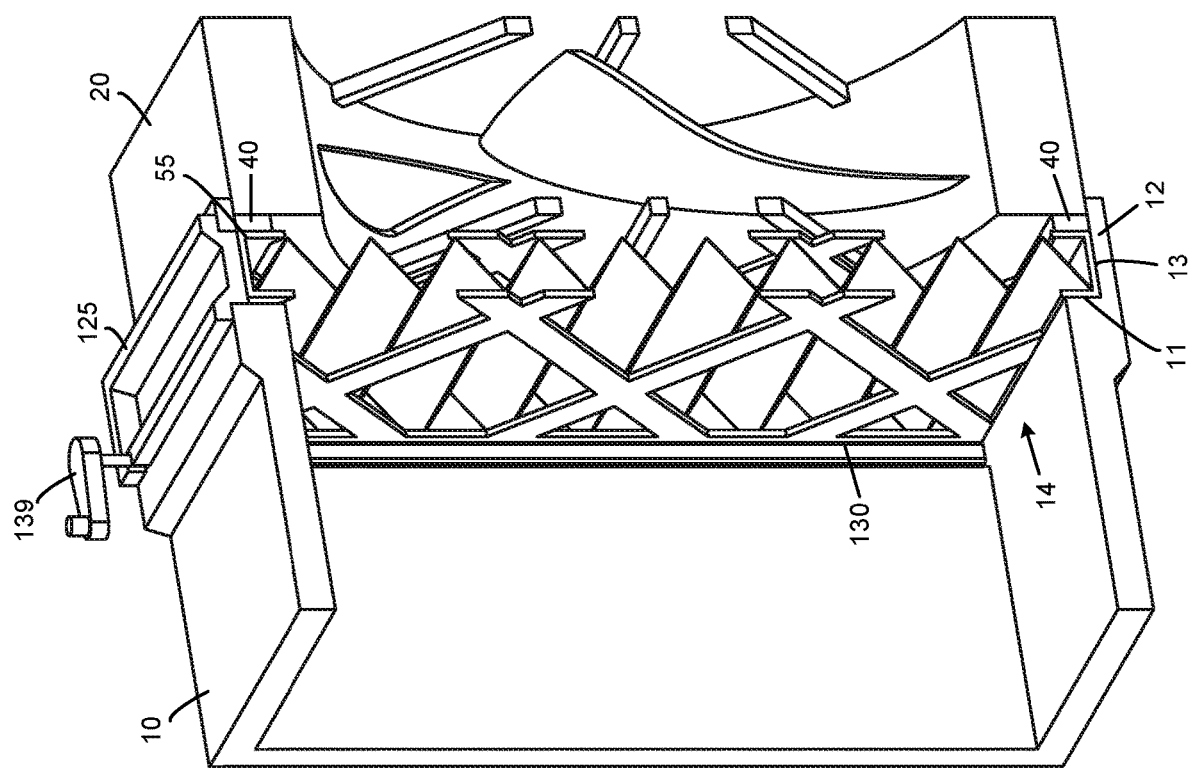
FIG. 42 is a perspective sectional view of the filter assembly, HVAC ductwork section, and fan of FIG. 39, taken along line 42-42, with a filter positioned in the filter compartment, and with the compressive members in an installation configuration.
Figure 43:
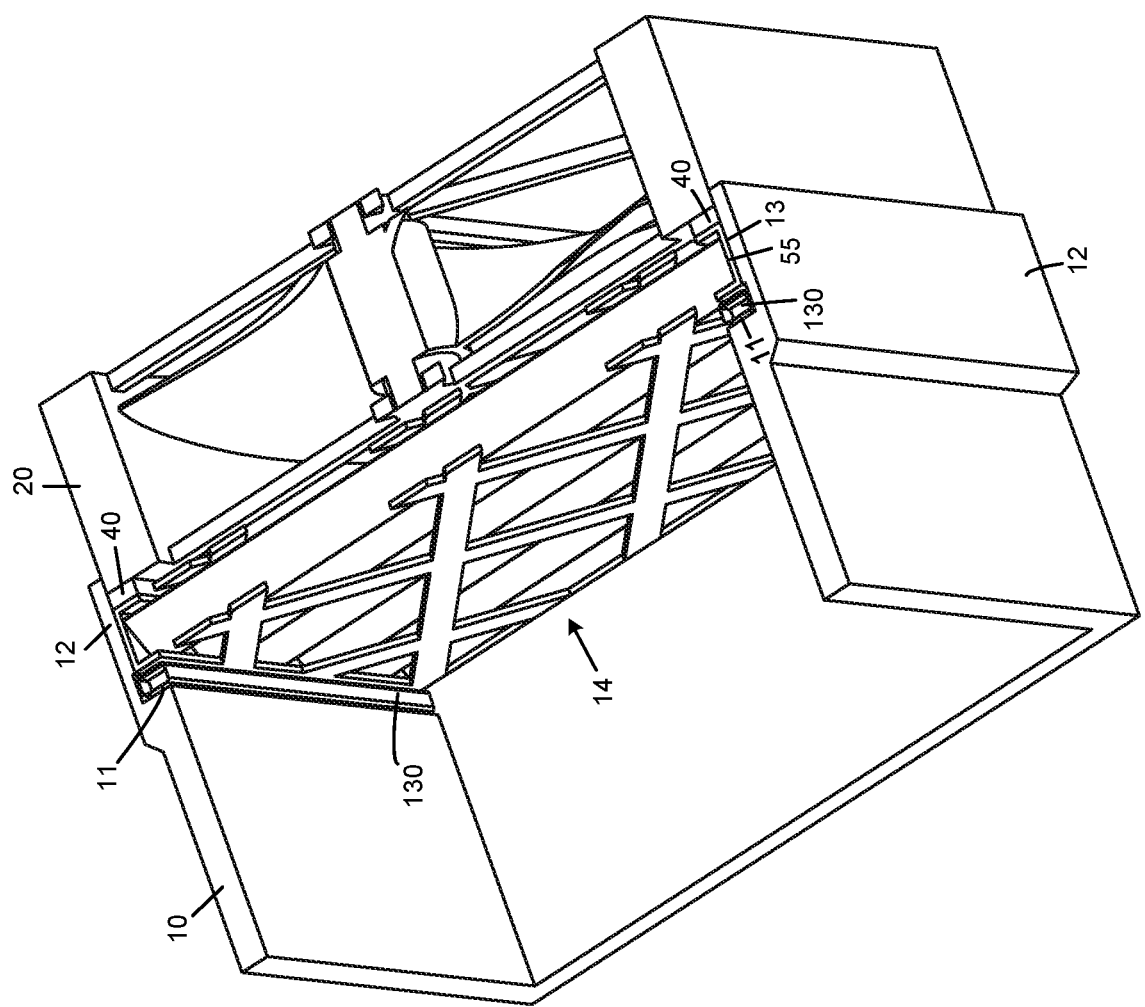
FIG. 43 is a perspective sectional view of the filter assembly, HVAC ductwork section, and fan of FIG. 39, taken along line 43-43, with a filter positioned in the filter compartment, and with the compressive members in an installation configuration.

As exemplified in FIGS. 39 to 44, compressive members 130 on each of the upstream and downstream sides of the filter may each be rotated about a respective longitudinal axis. In this example, after a filter 50 has been positioned in filter compartment 110, e.g. as illustrated in FIGS. 42 to 43, compressive members 130 may be rotated concurrently or sequentially to engage filter 50, as illustrated in FIGS. 39 to 41.

As exemplified, compressive members 130 may be rotated independently via their respective handles 139. An advantage of this configuration is that the compressive members 130 may be independently rotated into engagement with a filter 50 positioned in the filter compartment 110. Alternatively, compressive members 130 may be rotatable concurrently using a single actuator. For example, a belt drive or other linkage may be provided to so that rotation of one compressive member results in rotation of the other compressive member.

By way of further example, it will be appreciated that two or more insertable compressive members 130 may be used. For example, a first insertable compressive member 130 may be inserted into the filter assembly upstream of filter 50, and a second compressive member 130 may be inserted into the filter assembly downstream of the filter 50. In such an arrangement, a seal may be formed between the upstream compressive member and a first face 52 of filter 50 (e.g. face 51 of filter frame 55), and/or between the downstream compressive member and a second face 54 of filter 50 (e.g. face 53 of filter frame 55). One or both of these seals may inhibit air from bypassing filter 50 or exiting the HVAC ducting by travelling between filter frame 55 and interior surfaces 13 of filter compartment 110.

HVAC System with Air-to-Air Heat Exchanger and Filter Assembly

The following is a description of an HVAC system that includes an air-to-air heat exchanger and a filter assembly positioned upstream of at least one, and preferably each, air inlet to the heat exchanger to inhibit airborne particles from entering the heat exchanger. The filter assembly may be any of the filter assemblies disclosed herein.

In a typical cross-flow or counter-flow air-to-air heat exchanger, first and second airflows are directed along opposite sides of a heat transfer surface (e.g. a thin layer of metal or another thermally conductive material). If the airflows are not at the same temperature, thermal energy may be transferred from the warmer airflow to the cooler airflow via the heat transfer surface. An accumulation of particulate matter on one or both sides of such a heat transfer surface may reduce the efficiency and/or effectiveness of the heat exchanger. For example, the accumulated particulate matter may act as an insulating layer, thereby inhibiting heat transfer through the surface on which the debris is accumulated.

In accordance with this aspect, a filter sealed assembly (e.g. any filter assembly 100 as disclosed herein) is provided upstream of one or more air inlets to an air-to-air heat exchanger. An advantage of this design is that the sealed air filter assembly may inhibit or prevent dust or other particulate matter from entering the air inlet of the heat exchanger. Thus, dust or other particulate matter may be inhibited or prevented from accumulating on surfaces within the heat exchanger.

Figure 9:
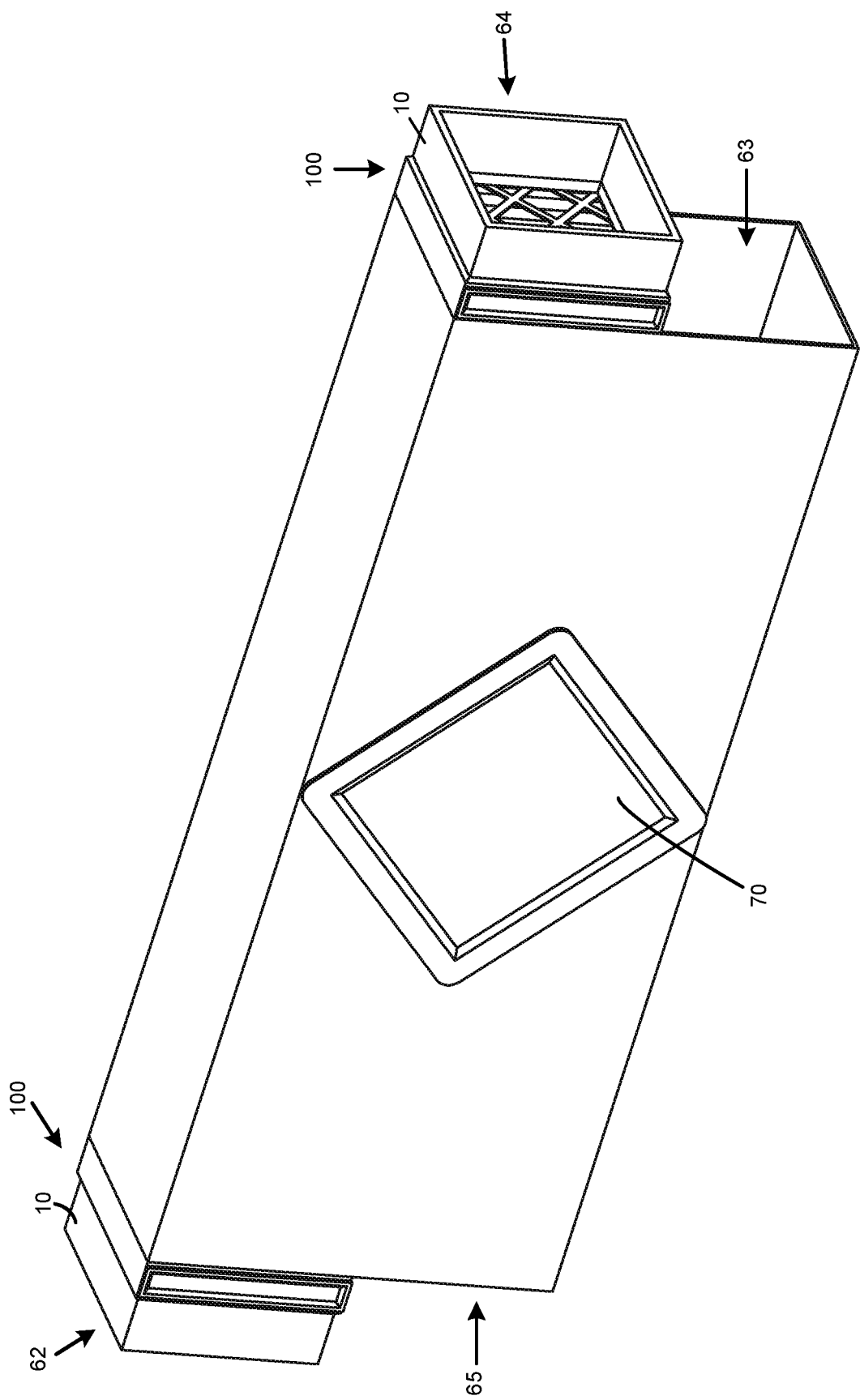
FIG. 9 is a perspective view of an HVAC system in accordance with one embodiment.
Figure 10:
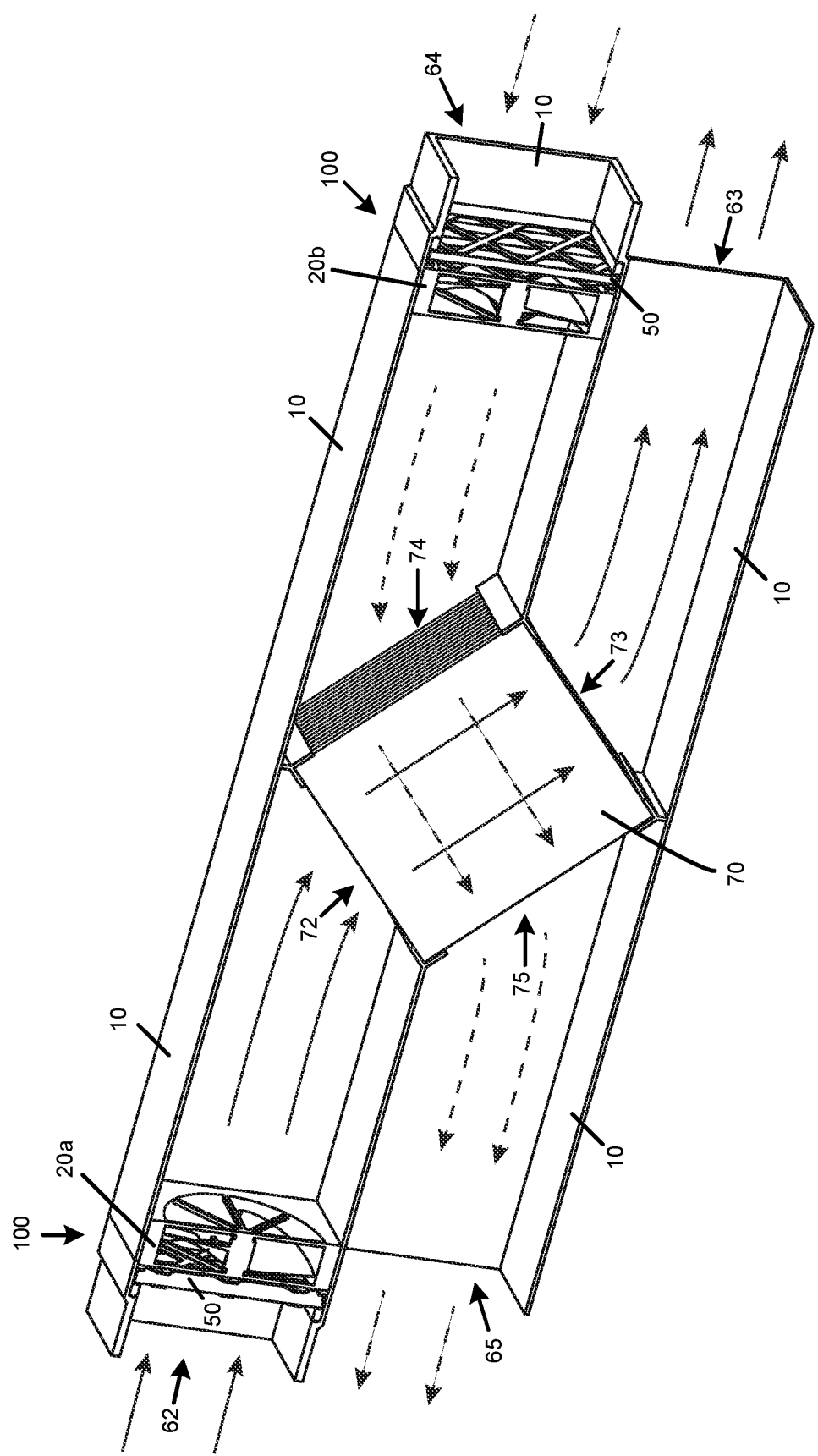
FIG. 10 is a perspective sectional view of the HVAC system of FIG. 9.
Figure 11:
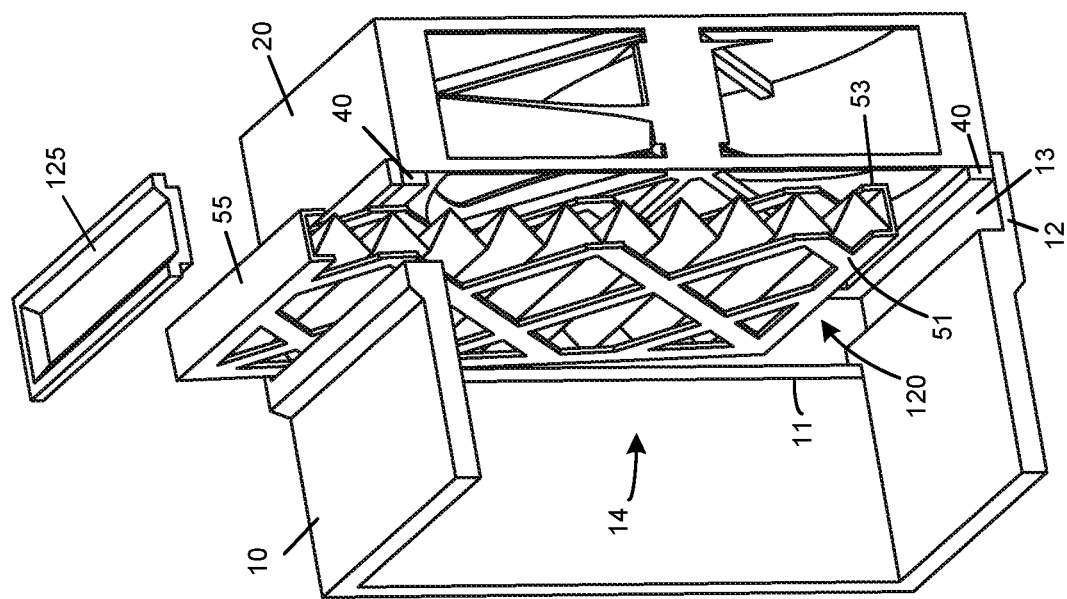
FIG. 11 is a perspective sectional view of a filter assembly, HVAC ductwork section, and fan in accordance with another embodiment, with a filter partially positioned in the filter compartment, and with a compressive member in an installation configuration.
Figure 12:
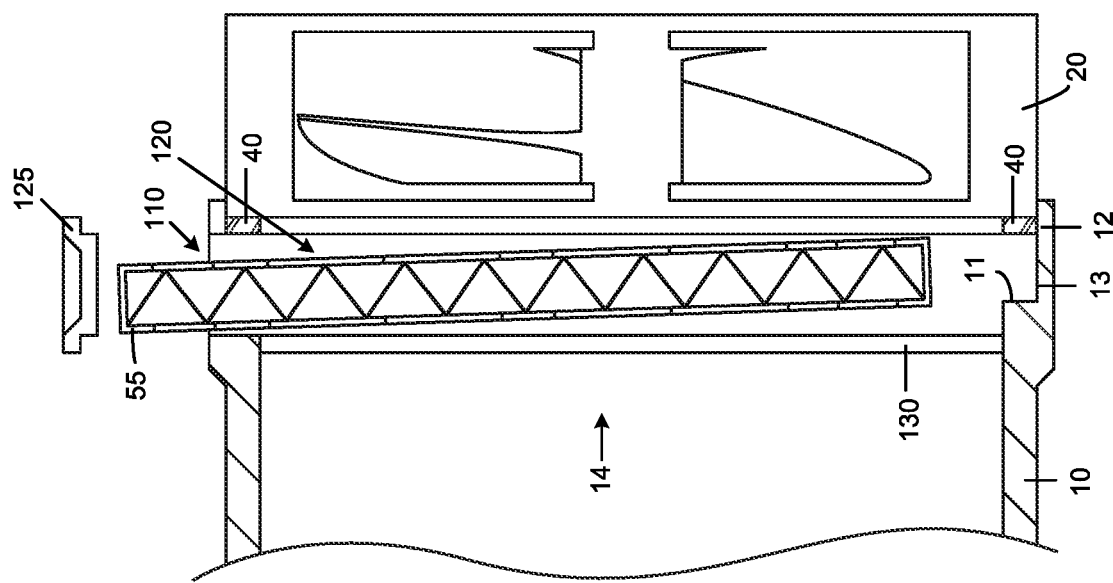
FIG. 12 is a cross-sectional view of the filter assembly, HVAC ductwork section, and fan of FIG. 11, with a filter partially positioned in the filter compartment, and with the compressive member in an installation configuration.
Figure 13:
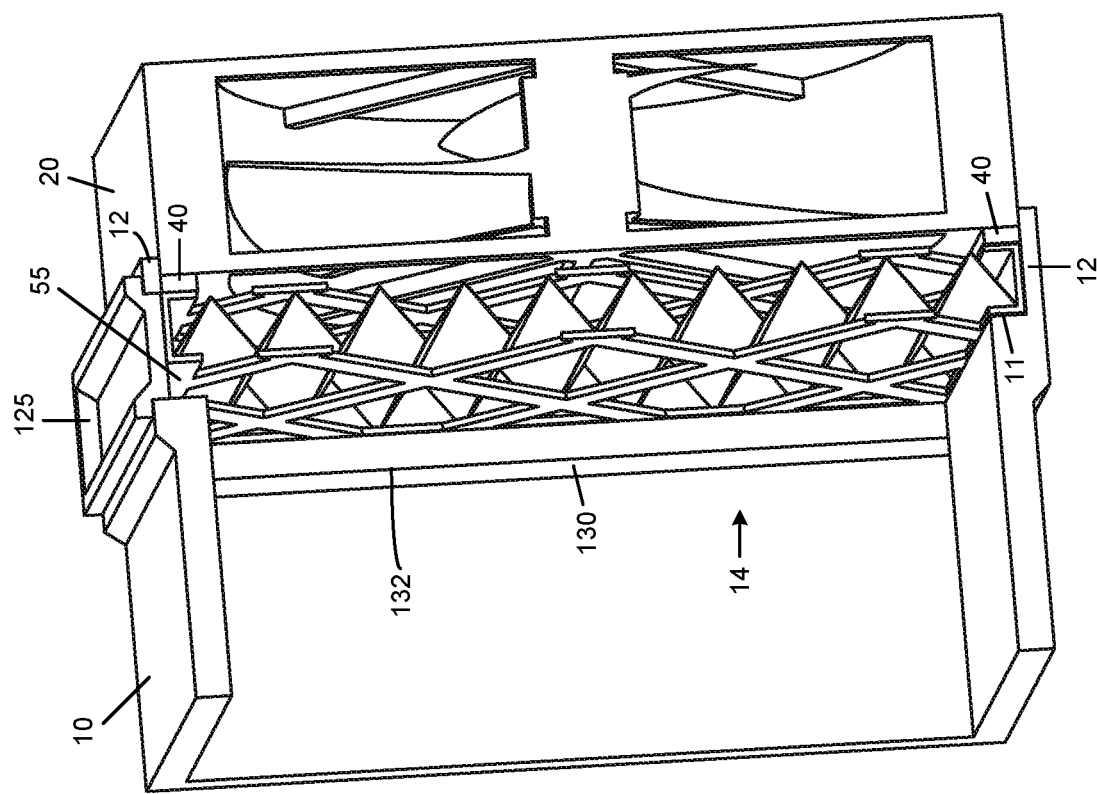
FIG. 13 is a perspective sectional view of the filter assembly, HVAC ductwork section, and fan of FIG. 11, with a filter positioned in the filter compartment, and with the compressive member in an installation configuration.
Figure 14:
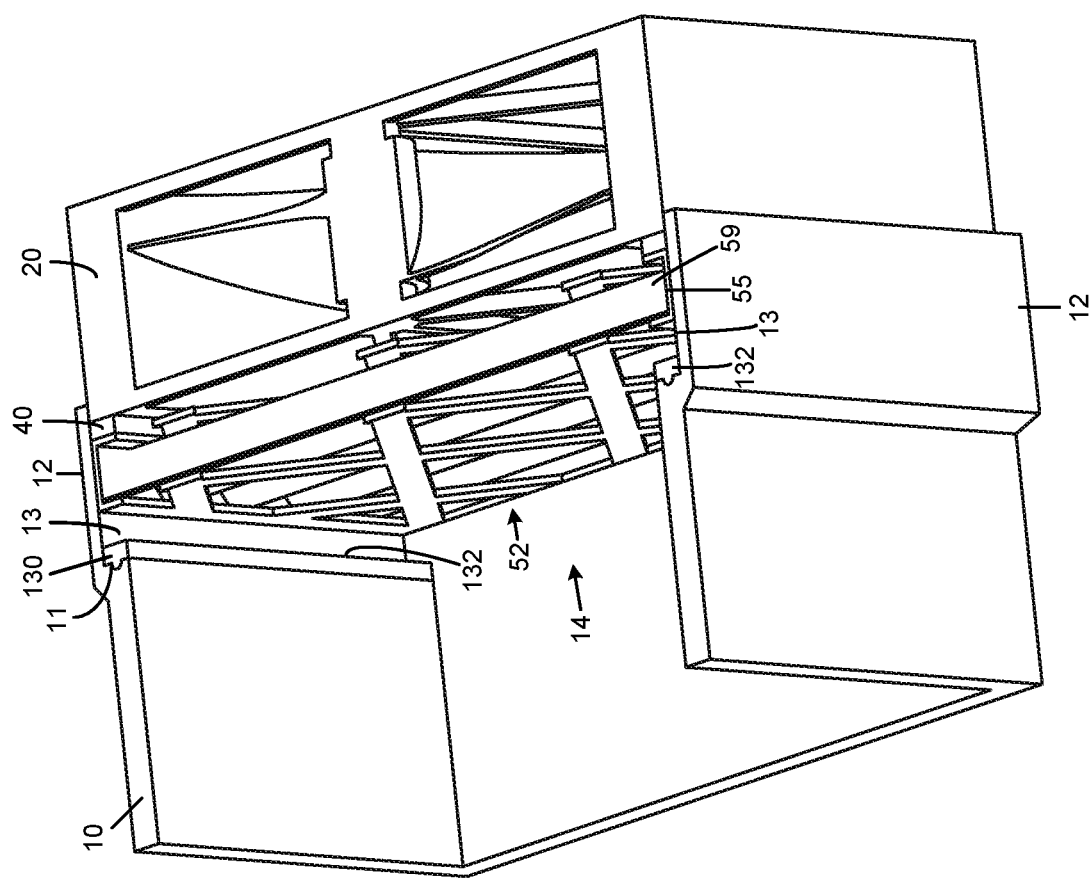
FIG. 14 is a top perspective sectional view of the filter assembly, HVAC ductwork section, and fan of FIG. 11, with a filter positioned in the filter compartment, and with the compressive member in an installation configuration.
Figure 15:
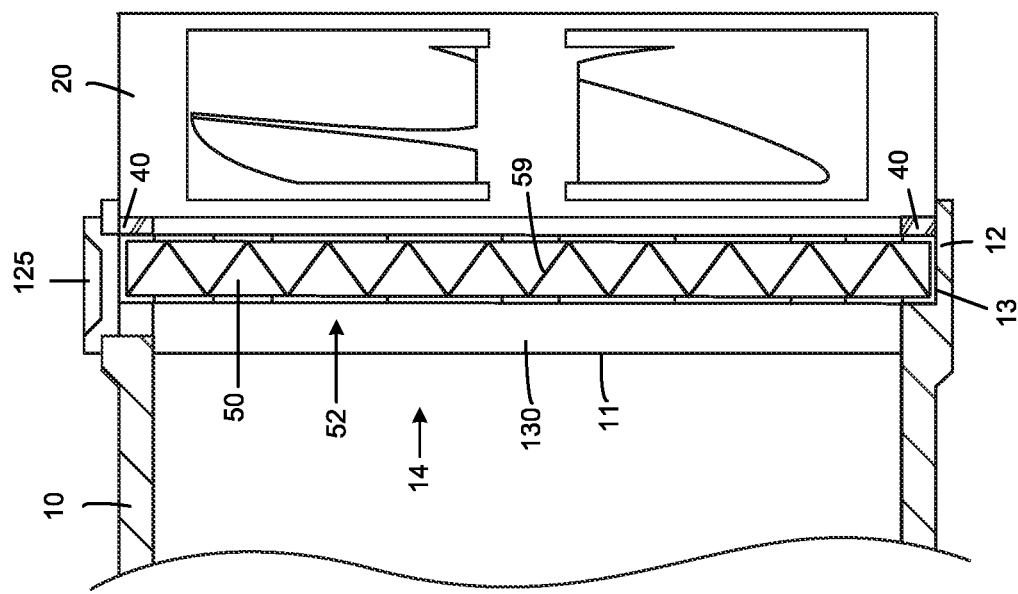
FIG. 15 is a cross-sectional view of the filter assembly, HVAC ductwork section, and fan of FIG. 11, with a filter positioned in the filter compartment, and with the compressive member in an installed configuration.

FIGS. 9 and 10 illustrate an example of an HVAC system with an air-to-air heat exchanger 70. In the illustrated example, a first air intake 62 may be for drawing in air from outside a building or unit, and first air outlet or exhaust 63 may be for supplying air to the building or unit. Also illustrated is a second air intake or inlet 64 for drawing in air from within the building or unit (e.g. from a bathroom or other expected source of warm air), and a second air outlet or exhaust 65 for exhausting the air to the outside of the building. It will be appreciated that one or more of intakes 62, 64 and exhausts 63, 65 may be coupled to airflow conduits 10 or other ducting to convey air from the intake or exhaust to a remote location in the ventilation system. For example, a conduit may be provided from exhaust 65 to a location proximate the building envelope, such as a shrouded wall exhaust and/or exhaust shaft and the like.

As shown in FIG. 10, the exemplary HVAC system also includes an air-to-air heat exchanger 70, such as a cross-flow or counter-flow heat exchanger, having air inlet ports 72 and 74, and air outlet ports 73 and 75. In use, supply fan 20 induces an airflow to draw air in from inlet 62, through heat exchanger 70 (via inlet port 72 and outlet port 73), and out of outlet 63. Concurrently, supply fan 20 may induce an airflow to draw air in from inlet 64, through heat exchanger 70 (via inlet port 74 and outlet port 75), and out of outlet 65. In this arrangement, when air from air inlet 64 is warmer than air from inlet 62, air flowing from inlet port 72 to outlet port 73 will be passively warmed by air flowing from inlet port 74 to outlet port 75. This will often be the case when inlet 64 draws in air from an interior room (e.g. a residential bathroom), and inlet 62 draws in air from the exterior or intake shaft of the building or residence, particularly in colder climates.

In the illustrated example, an inside air filter assembly 100 with a filter 50 is provided upstream of the heat exchanger inlet port 72, to inhibit or prevent dust or other particulate matter from entering heat exchanger inlet port 72. Also, an outside air filter assembly 100 with a filter 50 is provided upstream of the heat exchanger inlet port 74, to inhibit or prevent dust or other particulate matter from entering heat exchanger inlet port 74. Alternatively, only one of inside air filter assembly 100 and outside air filter assembly 100 may be provided.

In the illustrated example, the inside air filter assembly 100 and outside air filter assembly 100 are positioned upstream of their respective airflow fans 20a and 20b. An advantage of this configuration is that filters 50 may also inhibit or prevent dust or other particulate matter from reaching fans 20a and 20b, which may e.g. protect fans 20a and 20b from adverse effects of dust accumulation.

Alternatively, one or both of inside air filter assembly 100 and outside air filter assembly 100 may be positioned downstream of their respective airflow fans 20a and 20b. An advantage of such a configuration is that fans 20a and/or 20b may be more accessible for e.g. repair or replacement.

In any embodiment disclosed herein, or in an alternate embodiment (not shown), a filter 50 may include a compressive member 130, e.g. by adhering or otherwise securing a compressive member 130 to a filter 50. An advantage of this design is that a filter 50 and compressive member 130 may be inserted into and/or removed from filter compartment 110 as a unit.

In any embodiment disclosed herein, an optional sealing gasket 40 may be provided between filter 50 and fan 20. In this arrangement, when the filter 50 is engaged by compressive member 130 to press filter 50 against gasket 40, gasket 40 inhibits air from bypassing filter 50 by travelling between filter frame 55 and interior surfaces 13 of filter compartment 110.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An HVAC system utilizing an air-to-air heat exchanger comprising:
 a) an HVAC ductwork section including a fan;
 b) a filter assembly in fluid flow communication with the HVAC ductwork section, the filter assembly comprising a compressive member and a filter compartment for removably receiving a filter, the filter compartment comprising a flow path oriented generally transverse to a direction of air flow through the filter assembly and the compressive member wherein when the filter is positioned in the filter compartment, the filter is positioned in the flow path, wherein the compressive member is adjustable between an installation configuration in which the compressive member is spaced from a position that is to be occupied by the filter when the filter is installed in the filter compartment and an installed configuration in which the compressive member engages at least a portion of one of an upstream and a downstream face of the filter when the filter is positioned in the filter compartment.

2. The HVAC system as claimed in claim 1 wherein, in the installed configuration, the compressive member engages substantially all of a periphery of one of the upstream and the downstream face of the filter when the filter is positioned in the filter compartment.

3. The HVAC system as claimed in claim 1 wherein, in the installed configuration, the compressive member engages the downstream face of the filter.

4. The HVAC system as claimed in claim 3 wherein, in the installed configuration, the compressive member engages substantially all of a periphery of the downstream face of the filter.

5. The HVAC system as claimed in claim 1 wherein, in the installed configuration, the compressive member engages substantially both the upstream and the downstream face of the filter.

6. The HVAC system as claimed in claim 1 wherein, in the installed configuration, the compressive member engages the upstream face of the filter.

7. The HVAC system as claimed in claim 6 wherein, in the installed configuration, the compressive member engages substantially all of a periphery the upstream face of the filter.

8. The HVAC system as claimed in claim 1 wherein the compressive member is expandable after the filter has been installed in the filter compartment.

9. The HVAC system as claimed in claim 8 wherein the compressive member is inflatable.

10. The HVAC system as claimed in claim 1 wherein the portion of the perimeter having the compressive member is moveable towards and away from the position that is to be occupied by a filter when the filter is installed in the filter compartment whereby, in the installation configuration the portion is spaced from the position that is to be occupied by a filter when the filter is installed in the filter compartment.

11. A filter assembly for a HVAC apparatus comprising a filter compartment having:
 a) a flow path oriented generally transverse to a direction of air flow through the filter assembly;
 b) a perimeter extending around the flow path and,
 c) a compressive member,
wherein the compressive member is adjustable between an installation configuration in which the compressive member is spaced from a position that is to be occupied by a filter when the filter is installed in the filter compartment and an installed configuration in which the compressive member engages at least a portion of one of an upstream and a downstream face of the filter when the filter is positioned in the filter compartment.

12. The filter assembly as claimed in claim 11 wherein, in the installed configuration, the compressive member engages substantially all of a periphery of one of the upstream and the downstream face of the filter when the filter is positioned in the filter compartment.

13. The filter assembly as claimed in claim 11 wherein, in the installed configuration, the compressive member engages the downstream face of the filter.

14. The filter assembly as claimed in claim 13 wherein, in the installed configuration, the compressive member engages substantially all of a periphery of the downstream face of the filter.

15. The filter assembly as claimed in claim 11 wherein, in the installed configuration, the compressive member engages substantially both the upstream and the downstream face of the filter.

16. The HVAC system as claimed in claim 11 wherein, in the installed configuration, the compressive member engages the upstream face of the filter.

17. The HVAC system as claimed in claim 16 wherein, in the installed configuration, the compressive member engages substantially all of a periphery of the upstream face of the filter.

18. The filter assembly as claimed in claim 11 wherein the compressive member is expandable after the filter has been positioned in the filter compartment.

19. The filter assembly as claimed in claim 18 wherein the compressive member is inflatable.

20. The filter assembly as claimed in claim 11 wherein the portion of the perimeter having the compressive member is moveable towards and away from the position that is to be occupied by a filter when the filter is installed in the filter compartment whereby, in the installation configuration the portion is spaced from the position that is to be occupied by a filter when the filter is installed in the filter compartment.

21. An HVAC system comprising:
 a) an air-to-air heat exchanger, the air-to-air heat exchanger having an outside air inlet port and an inside air inlet port;
 b) an inside air HVAC ductwork section positioned upstream from the inside air inlet port, the inside air HVAC ductwork section including an inside air exhaust fan;
 c) an outside air HVAC ductwork section positioned upstream from the outside air inlet port, the outside air HVAC ductwork section including an outside air delivery fan; and,
 d) at least one of
  i) an inside air filter sealed assembly positioned upstream from the inside air inlet port; and,
  ii) an outside air filter sealed assembly positioned upstream from the inside air outlet port;
  wherein the at least one of the inside air filter sealed assembly and the outside air filter sealed assembly comprises a compressive member that is adjustable between an installation configuration in which the compressive member is spaced from a position that is to be occupied by a filter when the filter is installed and an installed configuration in which the compressive member engages at least a portion of one of an upstream and a downstream face of the filter when the filter is installed.

22. The HVAC system of claim 21 comprising both the inside air filter sealed assembly and the outside air filter sealed assembly.

23. The HVAC system of claim 21 comprising the inside air filter sealed assembly wherein the inside air sealed filter assembly is positioned upstream of the inside air exhaust fan.

24. The HVAC system of claim 21 comprising the outside air filter sealed assembly wherein the outside air sealed filter assembly is positioned upstream of the outside air delivery fan.

25. The HVAC system of claim 23 comprising the outside air filter sealed assembly wherein the outside air sealed filter assembly is positioned upstream of the outside air delivery fan.

* * * * *